(12) United States Patent
Nakanishi et al.

(10) Patent No.: US 8,320,444 B2
(45) Date of Patent: Nov. 27, 2012

(54) TRANSMISSION APPARATUS AND METHOD, RECEPTION APPARATUS AND METHOD, AND PROGRAM

(75) Inventors: Takashi Nakanishi, Tokyo (JP); Masato Kikuchi, Tokyo (JP); Shunsuke Mochizuki, Tokyo (JP); Masahiro Yoshioka, Tokyo (JP); Ryosuke Araki, Tokyo (JP); Masaki Handa, Kanagawa (JP); Hiroshi Ichiki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 822 days.

(21) Appl. No.: 12/433,241

(22) Filed: Apr. 30, 2009

(65) Prior Publication Data

US 2009/0279640 A1    Nov. 12, 2009

(30) Foreign Application Priority Data

May 12, 2008    (JP) ................. 2008-124268

(51) Int. Cl.
*H03K 7/04* (2006.01)
(52) U.S. Cl. ........................................ 375/239
(58) Field of Classification Search ............... 375/237, 375/238, 239, 242, 253
See application file for complete search history.

(56) References Cited

U.S. PATENT DOCUMENTS

2004/0228400 A1*  11/2004  Tanaka et al. ............... 375/239

FOREIGN PATENT DOCUMENTS

| JP | 60-13344 | 4/1985 |
|---|---|---|
| JP | 2001-7746 | 1/2001 |
| JP | 2001-168838 | 6/2001 |
| JP | 2006-270831 | 10/2006 |
| JP | 2007-6289 | 1/2007 |
| JP | 2007-266969 | 10/2007 |

* cited by examiner

*Primary Examiner* — Kevin Kim
(74) *Attorney, Agent, or Firm* — Oblon, Spivak, McClelland, Maier & Neustadt, L.L.P.

(57) ABSTRACT

A transmission apparatus includes a modulating section configured to modulate a baseband signal by using a carrier wave; a determining section configured to determine a pattern of the carrier wave, in accordance with a characteristic of a transmission channel on which a waveform represented by a signal value of a specific symbol is stationarily distorted according to a value of a symbol transmitted before or after the specific symbol; and a transmitting section configured to transmit a modulation signal through the transmission channel, the modulation signal being obtained by modulation using the determined carrier-wave pattern.

14 Claims, 32 Drawing Sheets

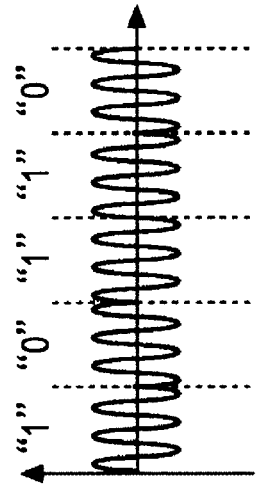
FIG. 2A — EXAMPLE OF VARYING AMPLITUDE (AMPLITUDE SHIFT KEYING)
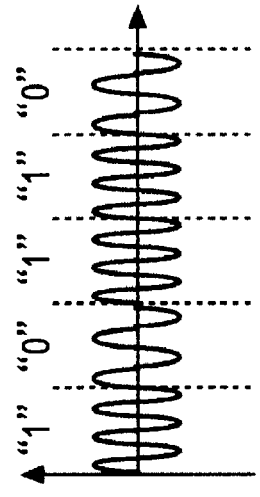
FIG. 2B — EXAMPLE OF VARYING FREQUENCY (FREQUENCY SHIFT KEYING)
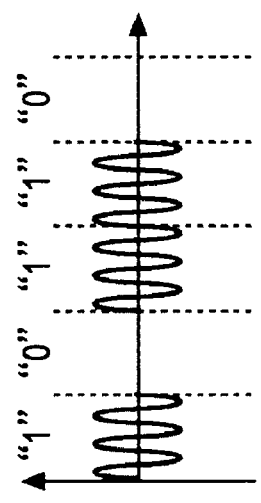
FIG. 2C — EXAMPLE OF VARYING PHASE (PHASE SHIFT KEYING)

FREQUENCY
ENVIRONMENT WHERE AMOUNT OF
TRANSMISSION-CHANNEL DISTORTION IS SMALL

{4TH PRECEDING BIT, 3RD PRECEDING BIT, 2ND PRECEDING BIT, 1ST PRECEDING BIT, CURRENT BIT}
= {1, 0, 0, 0, 0}

{4TH PRECEDING BIT, 3RD PRECEDING BIT, 2ND PRECEDING BIT, 1ST PRECEDING BIT, CURRENT BIT}
= {1, 1, 1, 1, 0}

TRANSMISSION DATA = (1, 1)

WAVEFORMS OF LPF OUTPUTS THAT VARY
ACCORDING TO CODE OF NEXT BIT

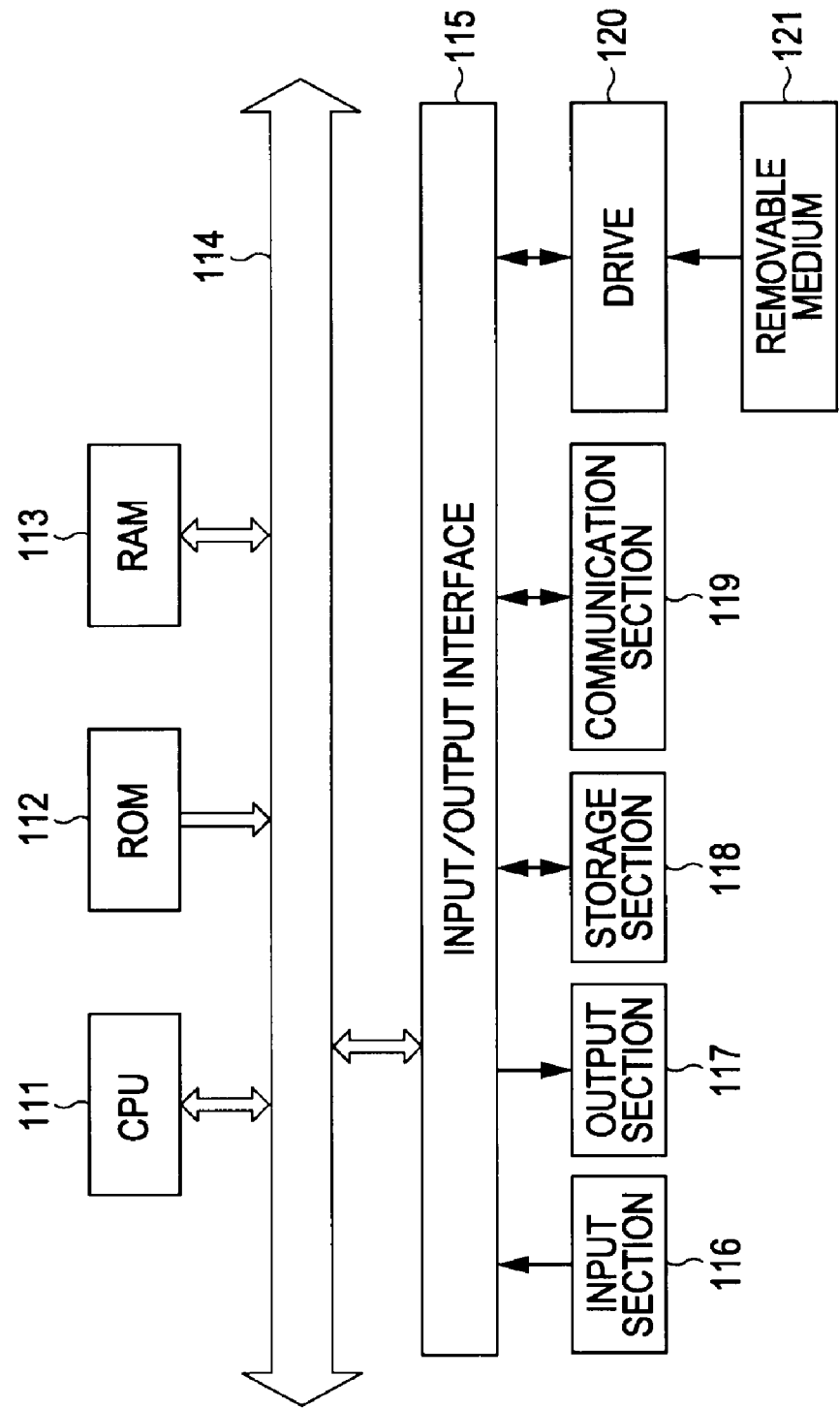

TRANSMISSION APPARATUS AND METHOD, RECEPTION APPARATUS AND METHOD, AND PROGRAM

BACKGROUND OF THE INVENTION

1. Field of the Invention

The present invention relates to transmission apparatuses and methods, reception apparatuses and methods, and programs. In particular, the present invention relates to a transmission apparatus and method, a reception apparatus and method, and a program which are capable of performing robust communication.

2. Description of the Related Art

As shown in FIG. 1, in typical wireless communication, a transmitter side multiplies an input baseband signal by a carrier wave and transmits the resulting radio signal (a modulation signal) to a receiving side.

The term "carrier wave (also referred to as a "carrier")" refers to, in communication, an unmodulated, information-bearing reference signal transmitted through a transmission cable (wired communication) or electrical waves (wireless communication), generally, through waves (light, sound waves, or the like). Typically, varying the amplitude, the frequency, or the phase of the carrier wave makes it possible to transmit various types of information.

FIGS. 2A to 2C illustrate typical modulation schemes. ASK (amplitude shift keying) modulation shown in FIG. 2A is an amplitude modulation scheme in which information is conveyed by the amplitude. FSK (frequency shift keying) modulation shown in FIG. 2B is a frequency modulation scheme in which information is conveyed by the frequency, and PSK (phase shift keying) modulation shown in FIG. 2C is a phase modulation scheme in which information is carried by the phase.

In addition to the above-described modulation schemes, for example, modulation schemes in which phase modulation and amplitude modulation are combined are also generally used, such as QAM (quadrature amplitude modulation).

A radio signal modulated by such a modulation scheme is transmitted to the receiving side.

As shown in FIG. 3, the receiving side in the wireless communication re-multiplies the received radio signal (the modulation signal) by a carrier wave and extracts low-frequency components through a LPF (low pass filter) to thereby reproduce the transmitted signal. The carrier wave is synchronous in frequency and phase with the carrier wave used during the modulation.

In recent years, in environments where transmission channels are affected by frequency selective distortion, a multi-carrier scheme such as OFDM (orthogonal frequency division multiplexing) is typically used. OFDM is a special multi-carrier transmission scheme in which information is divided into multiple carrier waves for transmission.

Advantages and disadvantages of OFDM will now be described.

[Advantages of OFDM]
(1) It is robust against frequency selective fading in a multi-path carrier channel, since a large number of sub-carrier waves (i.e., information transmission channels for respective carriers) are used.
(2) Frequency interleaving can be performed in addition to time interleaving and the effect of error correction can be effectively used.
(3) The symbol period is long, and provision of a guard interval (GI) can reduce interference due to reflection waves.
(4) Since the carrier waves in OFDM have low bit rates and are digitally modulated waves in a narrow band, the spectra of sub-channels can be closely arranged and the frequency utilization efficiency is high.
(5) It is possible to perform flexible information transmission, for example, without using a channel that is assumed to encounter interference.
(6) Information can be easily hierarchized, for example, by changing a modulation scheme for the sub carrier waves.

[Disadvantages of OFDM]
(1) Because of multi carriers, characteristic deterioration due to mutual modulation occurs when the transmission channel has a nonlinear characteristic.
(2) The transmitter and the receiver become complicated in order to maintain orthogonality of many carriers. In particular, the receiver may necessitate a special arrangement so that signals are correctly reproduced even if the transmission-channel characteristics vary.
(3) It is difficult to achieve symbol synchronization.
(4) Frequency offset causes characteristics between carriers to vary and deteriorate.
(5) Since an advantage is obtained by using a larger number of carriers, a large bandwidth in which a large number of channels are multiplexed is typically necessary even for audio transmission.
(6) A high-rate A/D (analog/digital) converter is typically necessary.

As a technology associated with OFDM, for example, Japanese Examined Patent Application Publication No. 60-13344 discloses a related technology.

SUMMARY OF THE INVENTION

However, in an environment where a transmission channel has frequency selective distortion, transmitted signals are distorted. Thus, with typical communication schemes including the technology disclosed in Japanese Examined Patent Publication No. 60-13344, communication may not be performed in some cases.

More specifically, in an environment where the amount of transmission-channel distortion is small, transmitted radio signals are rarely distorted because of no influence of frequency selective distortion, as expressed by a frequency on the horizontal axis and a transmission characteristic (S21) on the vertical axis in FIG. 4. On the other hand, as shown in FIG. 5, in an environment where the amount of transmission-channel distortion is large, large notches appear prominently at particular frequencies because of influence of frequency selective distortion.

That is, in an environment where the transmission channel has a frequency selective distortion, as shown in FIG. 5, the transmitted radio signals are distorted. Thus, with the communication scheme of the related art, communication may not be performed in some cases.

The present invention has been conceived in view of the foregoing situation, and it is desired to allow robust communication to be performed even in an environment where the amount of transmission-channel distortion is large.

According to a first embodiment of the present invention, there is provided a transmission apparatus. The transmission apparatus includes: modulating means for modulating a baseband signal by using a carrier wave; determining means for determining a pattern of the carrier wave, in accordance with a characteristic of a transmission channel on which a waveform represented by a signal value of a specific symbol is stationarily distorted according to a value of a symbol transmitted before or after the specific symbol; and transmitting means for transmitting a modulation signal through the transmission channel, the modulation signal being obtained by modulation using the determined carrier-wave pattern.

The transmission-channel characteristic may be determined through learning using a least-squares method. A known signal may be used as student data that serves as a student for learning a characteristic of the distortion and the known signal deteriorated through the transmission channel may be used as teacher data that serves as a teacher for learning the distortion.

The carrier-wave pattern may be a code-0 and code-1 combination with which an intercede distance is maximum when the transmission-channel characteristic obtained through the learning is used to estimate a reception waveform on the basis of all symbols patterns and carrier-wave patterns is maximum.

The carrier-wave pattern may be determined in a range of the number of carrier-wave signals, the number being determined in accordance with a size of influence of a symbol transmitted before the specific symbol, the influence being exerted on a specific symbol.

According to the first embodiment of the present invention, there is provided a transmission method. The transmission method includes the steps of: modulating a baseband signal by using a carrier wave; determining a pattern of the carrier wave, in accordance with a characteristic of a transmission channel on which a waveform represented by a signal value of a specific symbol is stationarily distorted according to a value of a symbol transmitted before or after the specific symbol; and controlling transmission of a modulation signal through the transmission channel, the modulation signal being obtained by modulation using the determined carrier-wave pattern.

According to the first embodiment of the present invention, there is provided a program corresponding to the above-described transmission method according to the first embodiment of the present invention.

In the transmission apparatus, the method, and the program according to the first embodiment of the present invention, a baseband signal is modulated by using a carrier wave; a pattern of the carrier wave is determined in accordance with a characteristic of a transmission channel on which a waveform represented by a signal value of a specific symbol is stationarily distorted according to a value of a symbol transmitted before or after the specific symbol; and transmission of a modulation signal through the transmission channel is controlled, the modulation signal being obtained by modulation using the determined carrier-wave pattern.

According to a second embodiment of the present invention, there is provided a reception apparatus. The reception apparatus includes: receiving means for receiving a modulation signal transmitted through a transmission channel on which a waveform represented by a signal value of a specific symbol is stationarily distorted according to a value of a symbol transmitted before or after the specific symbol; and demodulating means for demodulating the received modulation signal into a baseband signal by performing bit determination at a sampling position corresponding to a characteristic of the transmission channel.

The transmission-channel characteristic may be determined through learning using a least-squares method. A known signal may be used as student data that serves as a student for learning a characteristic of the distortion and the known signal deteriorated through the transmission channel may be used as teacher data that serves as a teacher for learning the distortion.

The sampling position may be a position at which an inter-code distance between code 0 and code 1 is maximum when the transmission-channel characteristic obtained through the learning is used to estimate a reception waveform on the basis of all symbols patterns and carrier-wave patterns.

According to the second embodiment of the present invention, there is provided a reception method. The reception method includes the steps of: controlling reception of a modulation signal transmitted through a transmission channel on which a waveform represented by a signal value of a specific symbol is stationarily distorted according to a value of a symbol transmitted before or after the specific symbol; and demodulating the received modulation signal into a baseband signal by performing bit determination at a sampling position corresponding to a characteristic of the transmission channel.

According to the second embodiment of the present invention, there is provided a program corresponding to the above-described reception method according to the second embodiment of the present invention.

In the reception apparatus, the method, and the program according to the second embodiment of the present invention, reception of a modulation signal transmitted through a transmission channel on which a waveform represented by a signal value of a specific symbol is stationarily distorted according to a value of a symbol transmitted before or after the specific symbol is controlled, and the received modulation signal is demodulated into a baseband signal by performing bit determination at a sampling position corresponding to a characteristic of the transmission channel.

As described above, according to the first embodiment of the present invention, it is possible to perform robust communication.

According to the second embodiment of the present invention, it is possible to simplify a receiving-side demodulation circuit.

BRIEF DESCRIPTION OF THE DRAWINGS

FIGS. 2A to 2C show examples of typical radio modulation;

FIG. 36 is a block diagram showing an example of the configuration of a personal computer.

DESCRIPTION OF THE PREFERRED EMBODIMENTS

Embodiments of the present invention will be described below with reference to the accompanying drawings.

A principle for enhancing robustness of a communication quality in the present invention will first be described with reference to FIGS. 6 to 10.

The present invention is applicable to communication in which multipath that occurs during wireless transmission of signals has relatively stationary characteristics, for example, communication between substrates/large scale integration (LSI) circuits in an housing, communication between fixed terminals, communication between buildings, and communication between a desktop personal computer (PC) placed in a house and an access point (AP) connected in a wireless local area network (LAN). In the present embodiment, inter-substrate/inter-LSI-circuit communication performed in the housing of an apparatus will be described by way of example.

Figure 1:
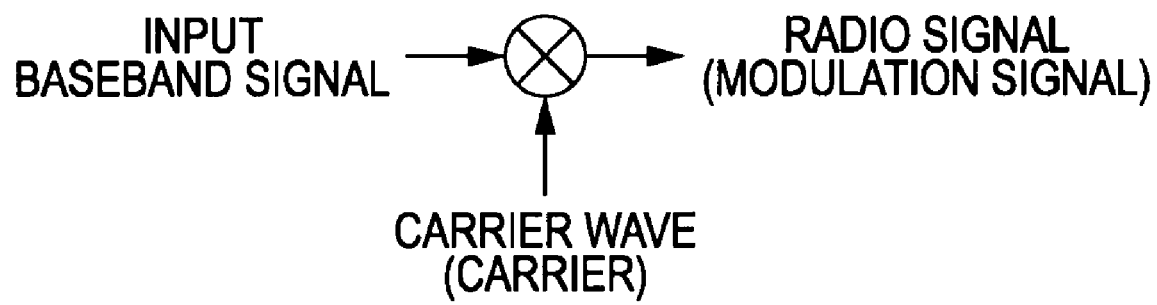
FIG. 1 is a schematic diagram showing the configuration of typical radio modulation.
Figure 3:
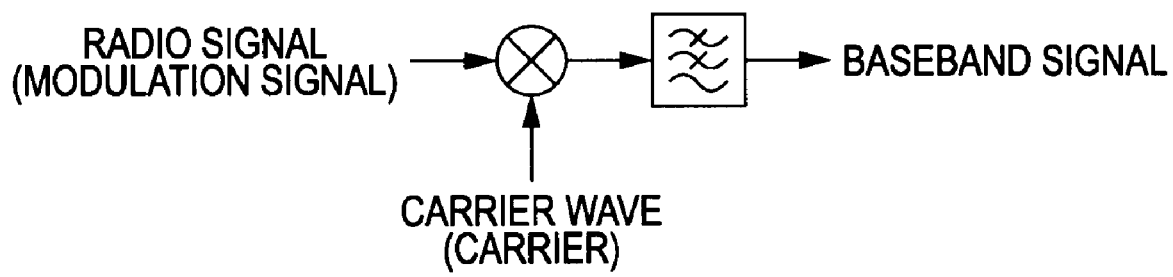
FIG. 3 is a schematic diagram showing the configuration of the typical radio modulation.
Figure 4:
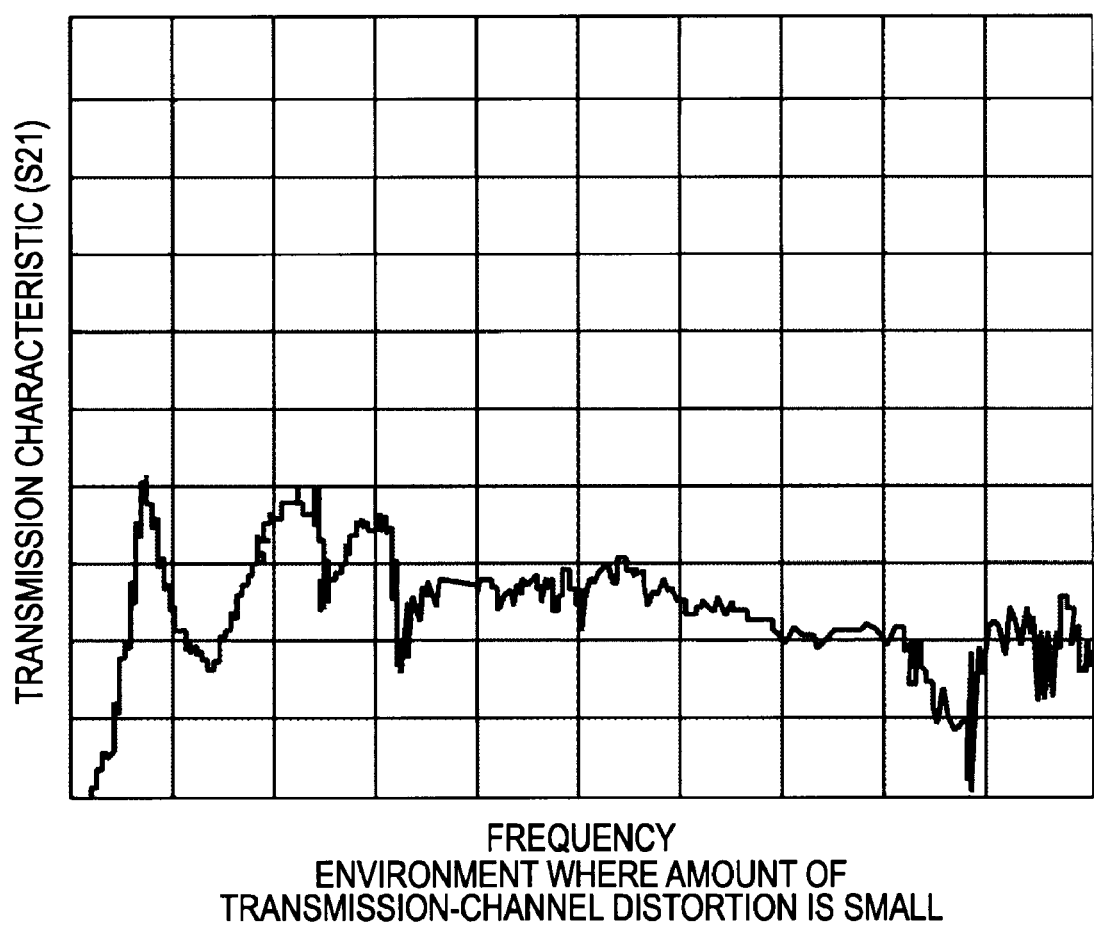
FIG. 4 is a graph showing an example of a transmission-channel characteristic in an environment where the amount of transmission-channel distortion is small.
Figure 5:
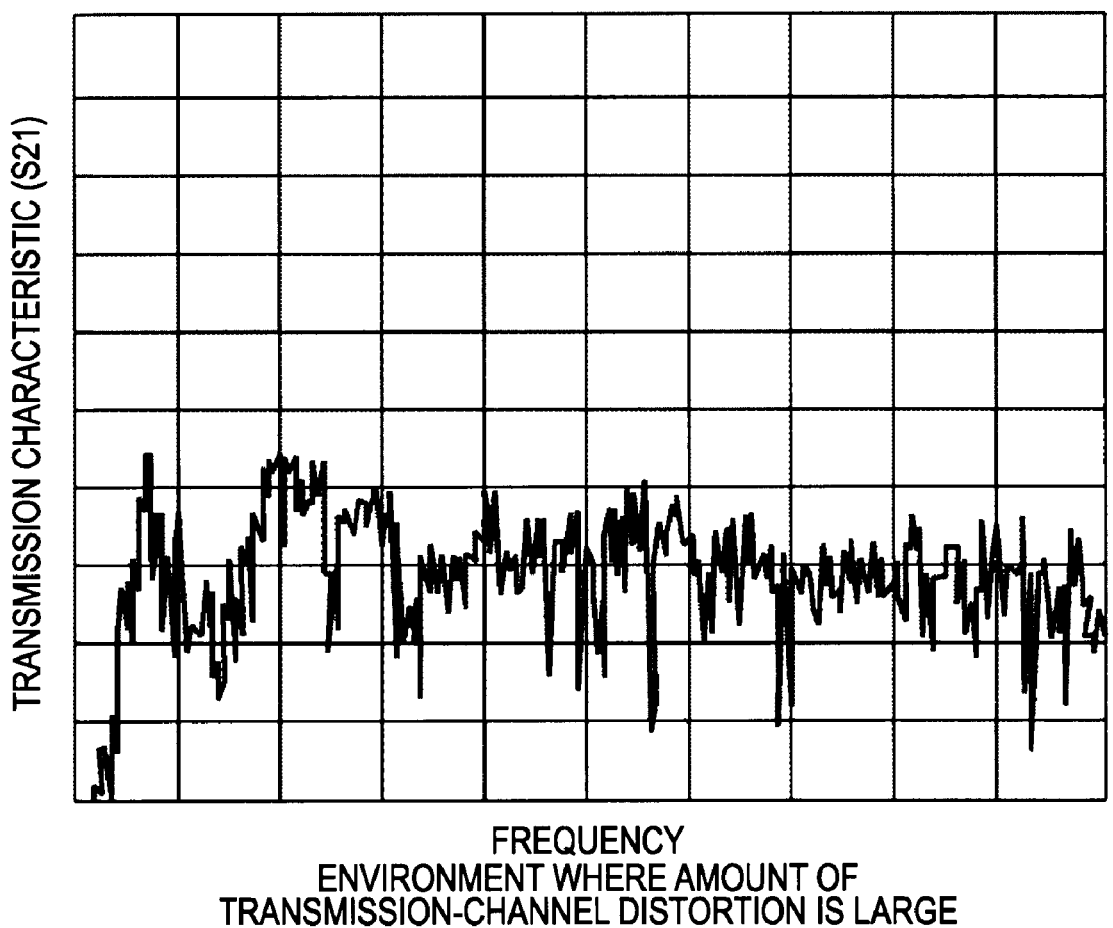
FIG. 5 is a graph showing an example of a transmission-channel characteristic in an environment where the amount of transmission-channel distortion is large.
Figure 6:
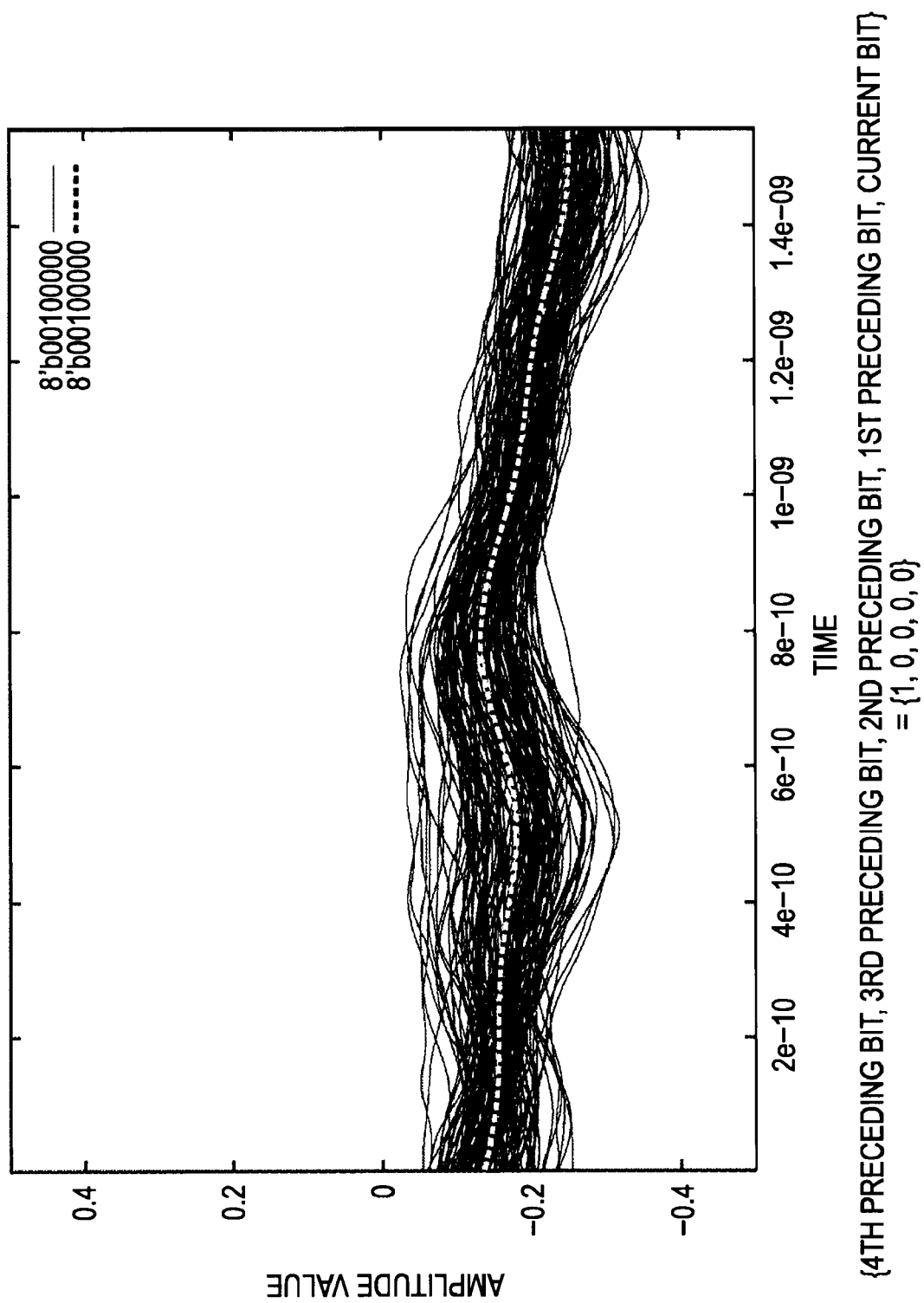
FIG. 6 is a graph illustrating a state in which received waveforms vary according to a bit pattern.

FIG. 6 is a graph showing a state in which waveforms received by a receiver side vary according to a transmission bit pattern.

In FIG. 6, the horizontal axis indicates a time axis and the time passes from the left-hand side in the figure to the right-hand side. The vertical axis indicates amplitude values of the reception waveforms, and the higher or lower it goes, the greater the amplitude is.

The reception waveforms shown in FIG. 6 are obtained by superimposing reception waveforms (per time for one bit) that vary greatly according to a pattern of bits transmitted before the current bit of interest.

FIG. 6 also shows reception waveforms of a case in which the current bit is 0, the first preceding bit is 0, the second preceding bit is 0, the third preceding bit is 0, and the fourth preceding bit is 1, the first to fourth preceding bits being temporally previous to the current bit.

In the present embodiment, a pattern of the fourth preceding bit to the current bit is represented by [the fourth preceding bit, the third preceding bit, the second preceding bit, the first preceding bit, the current bit]. For example, the reception waveform in FIG. 6 is represented by [1, 0, 0, 0, 0].

Figure 7:
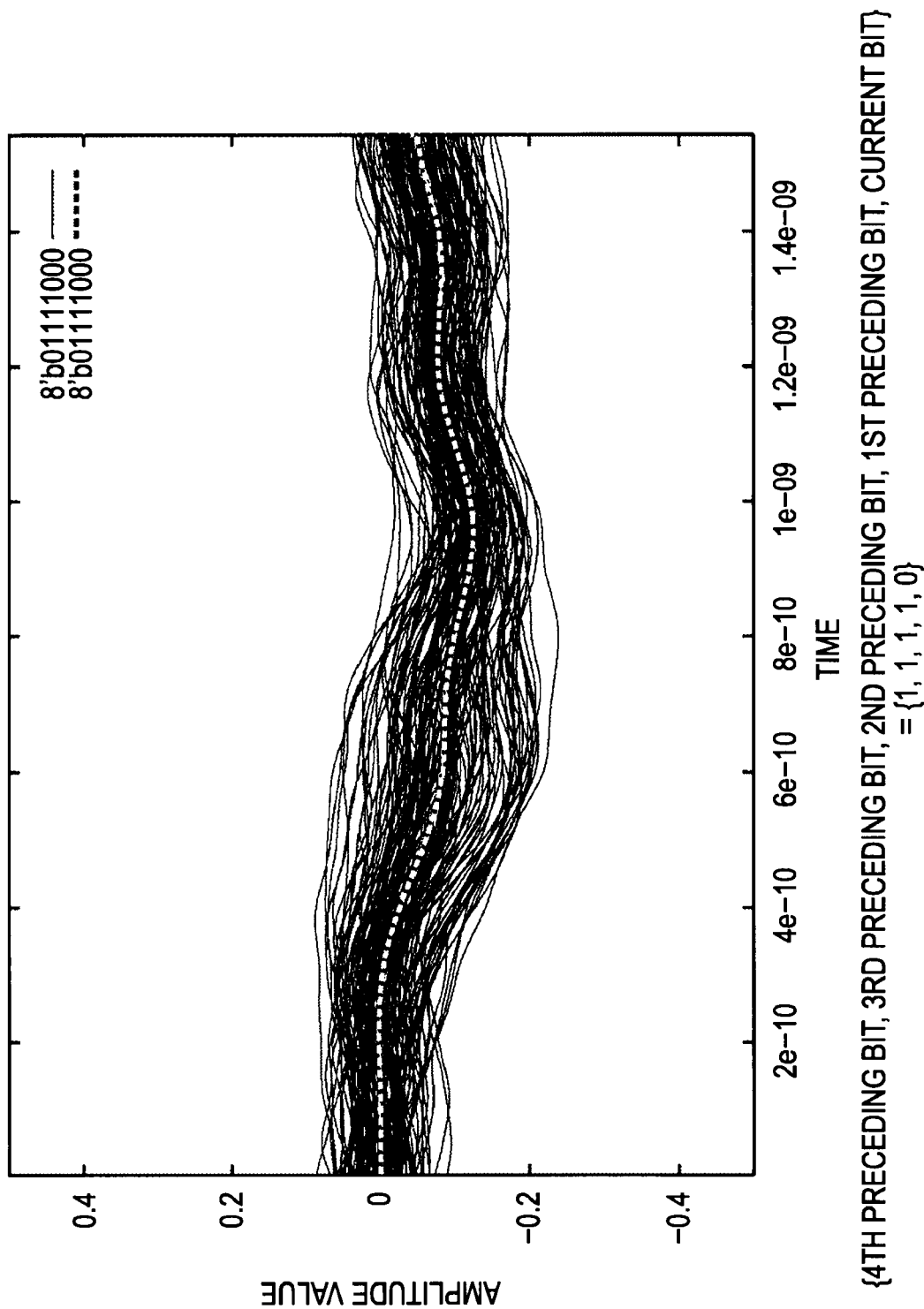
FIG. 7 is a graph illustrating how received waveforms vary according to a bit pattern.

Similarly to FIG. 6, FIG. 7 shows a state in which reception waveforms vary according to a transmission bit pattern. More specifically, FIG. 7 shows reception waveforms of a case in which the current is 0, the first preceding bit is 1, the second preceding bit is 1, the third preceding bit is 1, and the fourth preceding bit is 1, the first to fourth preceding bits being temporally previous to the current bit. That is, the reception waveform shown in FIG. 7 is [1, 1, 1, 1, 0].

Both reception waveforms shown in FIGS. 6 and 7 are obtained for bit sections of code 0. It can be understood that DC offset positions, waveforms, and so on are different from each other significantly by an influence of reflection waveforms of n bits (four bits in the examples of FIGS. 6 and 7) before the current bit of interest.

Figure 8:
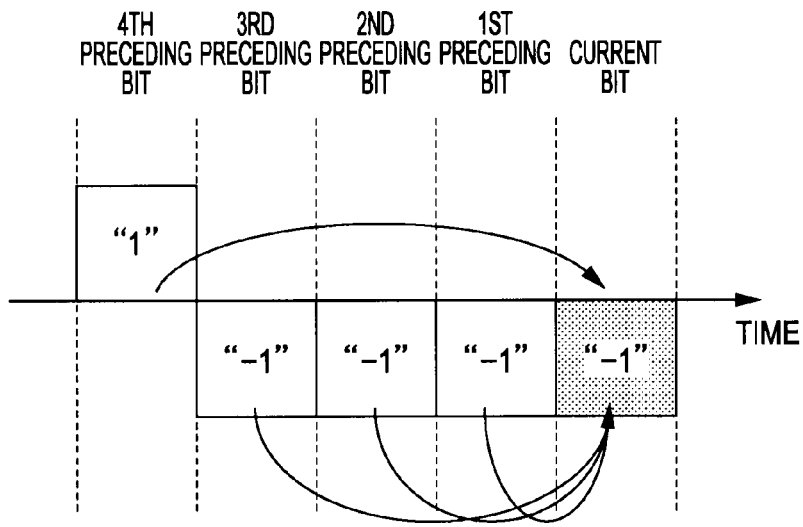
FIG. 8 is a graph illustrating how the received waveform varies according to a bit pattern, FIG. 8 corresponding to FIG. 6.
Figure 9:
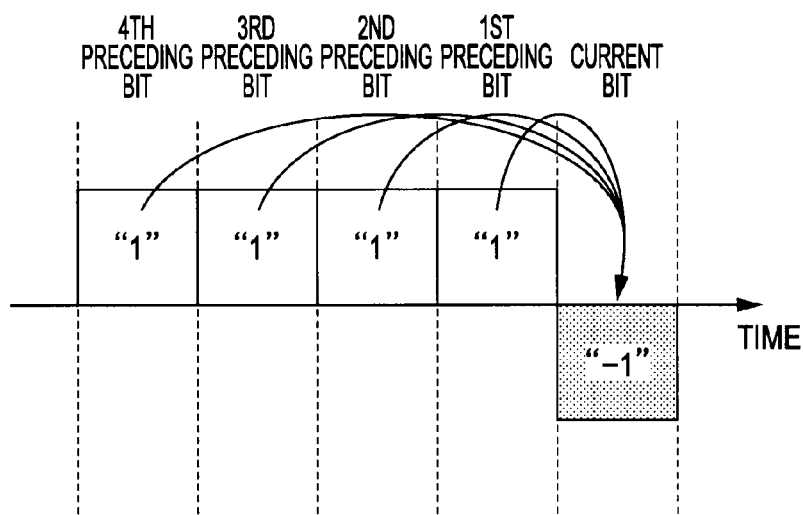
FIG. 9 is a graph illustrating a mechanism indicating how the received waveform varies according to a bit pattern, FIG. 9 corresponding to FIG. 7.

This is because, as shown in FIGS. 8 and 9, data transmitted before the current bit of interest are reflected by, for example, walls and/or another substrate in the housing and the reflected data are superimposed on data of the current bit with delay.

FIG. 8 is a diagram showing an influence of previously transmitted bits on the current bit in the case of "1, 0, 0, 0, 0" indicated by the waveform shown in FIG. 6. As indicated by arrows in FIG. 8, data of temporally previous four bits, i.e., a first preceding bit to the fourth preceding bit, are superimposed on the current bit indicated by a hatched square.

In FIG. 8, code 0 is represented by "−1" below the time axis and code 1 is represented by "1" above the time axis. Thus, for a case of "1, 0, 0, 0, 0" as shown in FIG. 8, the current bit, the first preceding bit, the second preceding bit, and the third preceding bit are "−1" and the fourth preceding bit is "1".

On the other hand, FIG. 9 is a diagram showing an influence of the previously transmitted bits on the current bit in the case of "1, 1, 1, 1, 0" indicated by the reception waveform shown in FIG. 7. As in the case shown in FIG. 8, data of the first preceding bit to the fourth preceding bit which are represented by "1" are superimposed on the hatched current bit represented by "−1".

In this manner, bits transmitted before a current bit of interest are reflected by walls and so on in the housing and are superimposed on the current bit, and thus, the reception waveform varies greatly. That is, the pattern of the preceding bits causes the reception waveform to vary greatly.

Accordingly, in order to reduce the influence of the preceding and subsequent bit patterns, the present invention proposes a modulation system for selecting such a carrier-wave pattern that the number of errors is the smallest during reproduction of received signals when wireless communication is performed in an environment where the amount of frequency-selective distortion is large. The reason why the influence of the subsequent bit is considered is described below with reference to FIGS. 21 to 23.

Figure 10:
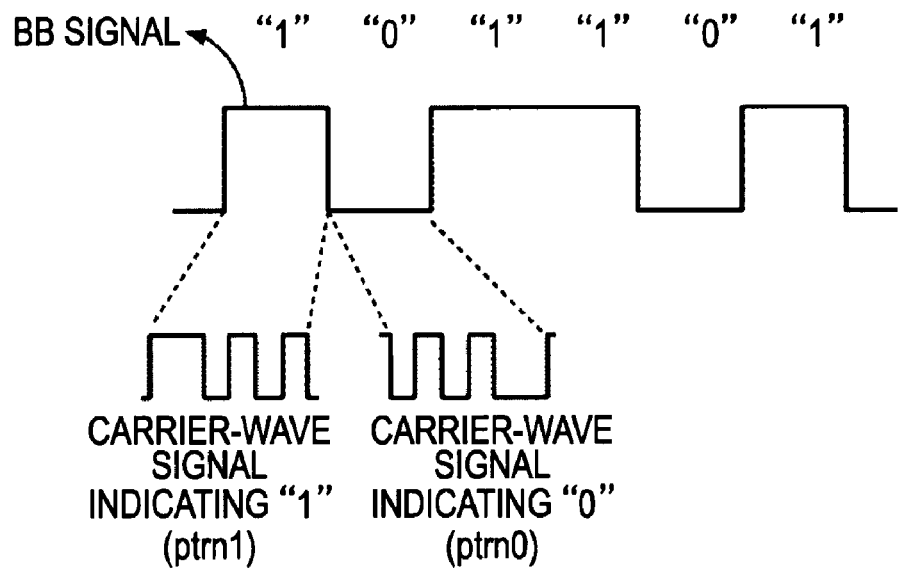
FIG. 10 illustrates a principle of improving robustness of a communication quality according to an embodiment of the present invention.

The carrier-wave pattern is a pattern for replacing a signal having code 1 or code 0 in a baseband signal (BB signal), as shown in FIG. 10, and has ptrn1 that serves as a carrier-wave signal indicating code 1 and ptrn0 that serves as a carrier-wave signal indicating code 0. In the present invention, during reception of the receiver, a combination of ptrn1 and ptrn0 is selected so that a distance between code 1 and code 0 becomes maximum, the selected combination is transmitted as a carrier-wave signal, and bit determination is performed at a sampling position at which the distance between codes in a symbol becomes maximum. With this arrangement, the number of errors during reproduction of received signals is reduced.

Figure 11:
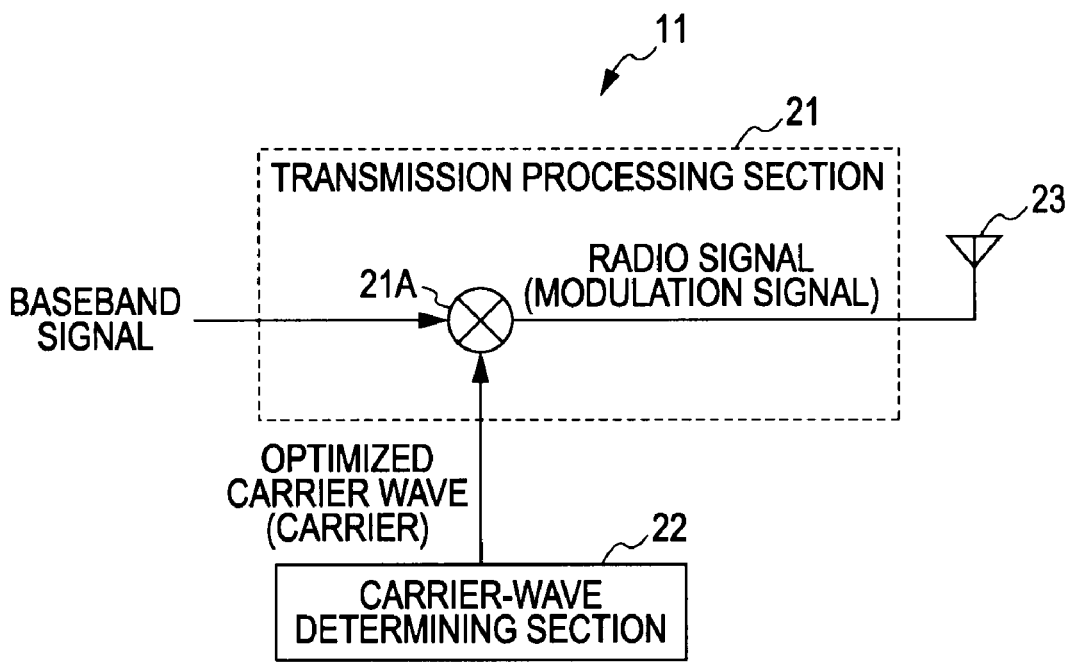
FIG. 11 is a schematic diagram showing the configuration of a transmitter according to an embodiment of the present invention.
Figure 12:
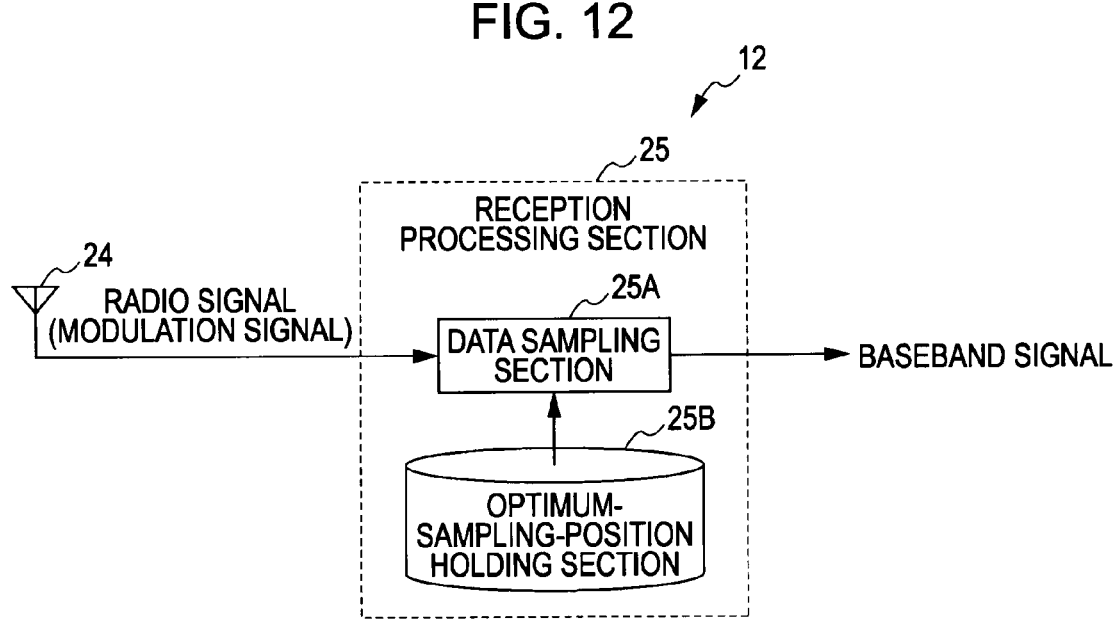
FIG. 12 is a schematic diagram showing the configuration of a receiver according to an embodiment of the present invention.

In order to achieve the above-described function, a communication system according to an embodiment of the present invention includes a transmitter 11 shown in FIG. 11 and a receiver 12 shown in FIG. 12.

That is, the transmitter 11 is one embodiment of a transmitting apparatus according to the present embodiment. FIG. 11 shows an example of the configuration of the transmitter 11.

As shown in FIG. 11, the transmitter 11 includes a transmission processing section 21, a carrier-wave determining section 22, and an antenna 23. The transmission processing section 21 has a multiplier 21A.

As shown in FIG. 11, a baseband signal is input to the transmitter 11 and is multiplied by a carrier wave (a carrier) by the multiplier 21A and the resulting signal is transmitted as a radio signal (a modulation signal) by the antenna 23. The carrier wave in this case is an optimized carrier wave.

That is, the carrier wave determining section 22 determines a combination of ptrn1 and ptrn0 so that a distance between code 1 and code 0 of a radio signal received by the receiver 12 becomes maximum and supplies the determined combination to the transmission processing section 21 as an optimized carrier wave. In turn, the multiplier 21A in the transmission processing section 21 multiplies the input baseband signal by the optimized carrier wave to thereby generate a modulation radio signal. The antenna 23 then transmits the radio signal, modulated using the optimized carrier wave, to the receiver 12.

The ptrn1 and ptrn0 combination with which the distance between code 1 and code 0 becomes maximum can be determined through learning described below.

The receiver 12 is also one embodiment of a receiving apparatus according to the present embodiment. FIG. 12 shows an example of the configuration of the receiver 12.

As shown in FIG. 12, the receiver 12 includes an antenna 24 and a reception processing section 25. The reception processing section 25 has a data sampling section 25A and an optimum-sampling-position holding section 25B.

As shown in FIG. 12, in the receiver 12, the antenna 24 receives the radio signal (the modulation signal) from the transmitter 11, and during extraction of the baseband signal from the received radio signal, the data sampling section 25A performs sampling at an optimized sampling position.

That is, the data sampling section 25A performs bit determination at a spot at which the distance between codes in a symbol is maximum, the spot being specified by an optimum sampling position supplied from the optimum-sampling-position holding section 25B. A baseband signal obtained through the bit determination is output to a subsequent circuit (not shown).

The optimum sampling position is determined through learning described below.

The transmitter 11 and the receiver 12 are configured as described above.

When the system according to the embodiment of the present invention is regarded as a communication system that includes the transmitter 11 and the receiver 12, the carrier wave transmitted from the transmitter 11 and the configuration of the demodulation circuit in the receiver 12 are different significantly from the carrier wave and the configuration of the related art.

The optimum carrier wave set by the transmitting-side transmitter 11 and the optimum sampling position set by the receiving-side receiver 12 are determined using a transmission channel profile indicating transmission-channel characteristics obtained through learning that utilizes, for example, a least-squares method. The learning of the transmission-channel profile will be described next.

Figure 13:
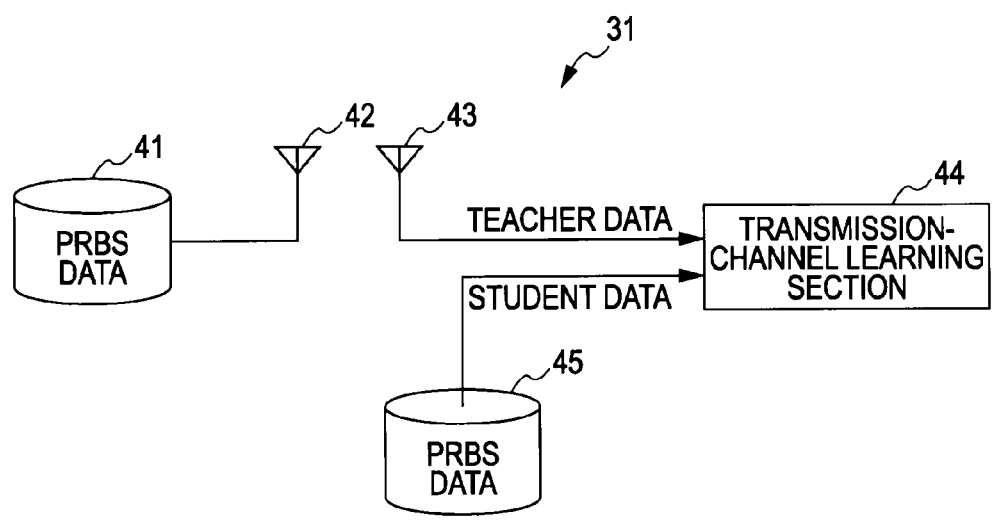
FIG. 13 is a schematic view of a learning apparatus.

FIG. 13 is a schematic diagram showing a learning apparatus for learning the transmission-channel profile.

As shown in FIG. 13, a learning apparatus 31 has a transmitting side and a receiving side. The transmitting side includes a PRBS (pseudo random bit sequence) data holding section 41 and an antenna 42, and the receiving side includes an antenna 43, a transmission-channel learning section 44, and a PRBS-data holding section 45. Communication between the antennas 42 and 43 is performed wirelessly.

The antenna 42 at the transmitting side transmits, at the same frequency as that of the carrier wave, PRBS data that is held by the PRBS-data holding section 41 and is synchronized with data of the receiving side. In turn, the antenna 43 at the receiving side receives the PRBS data, which has been subjected to antenna characteristics and transmission-channel distortion. The received data is input to the transmission-channel learning section 44 as teacher data in synchronization with student data sent from the PRBS data holding section 45 at the receiving side.

In the synchronization, it is sufficient that the symbol positions of the teacher data and the student data roughly synchronize with each other. Thus, the same signal that continues relatively sequentially and that are low in signal changes and a pattern of carrier waves at a minimum frequency are used.

Figure 14:
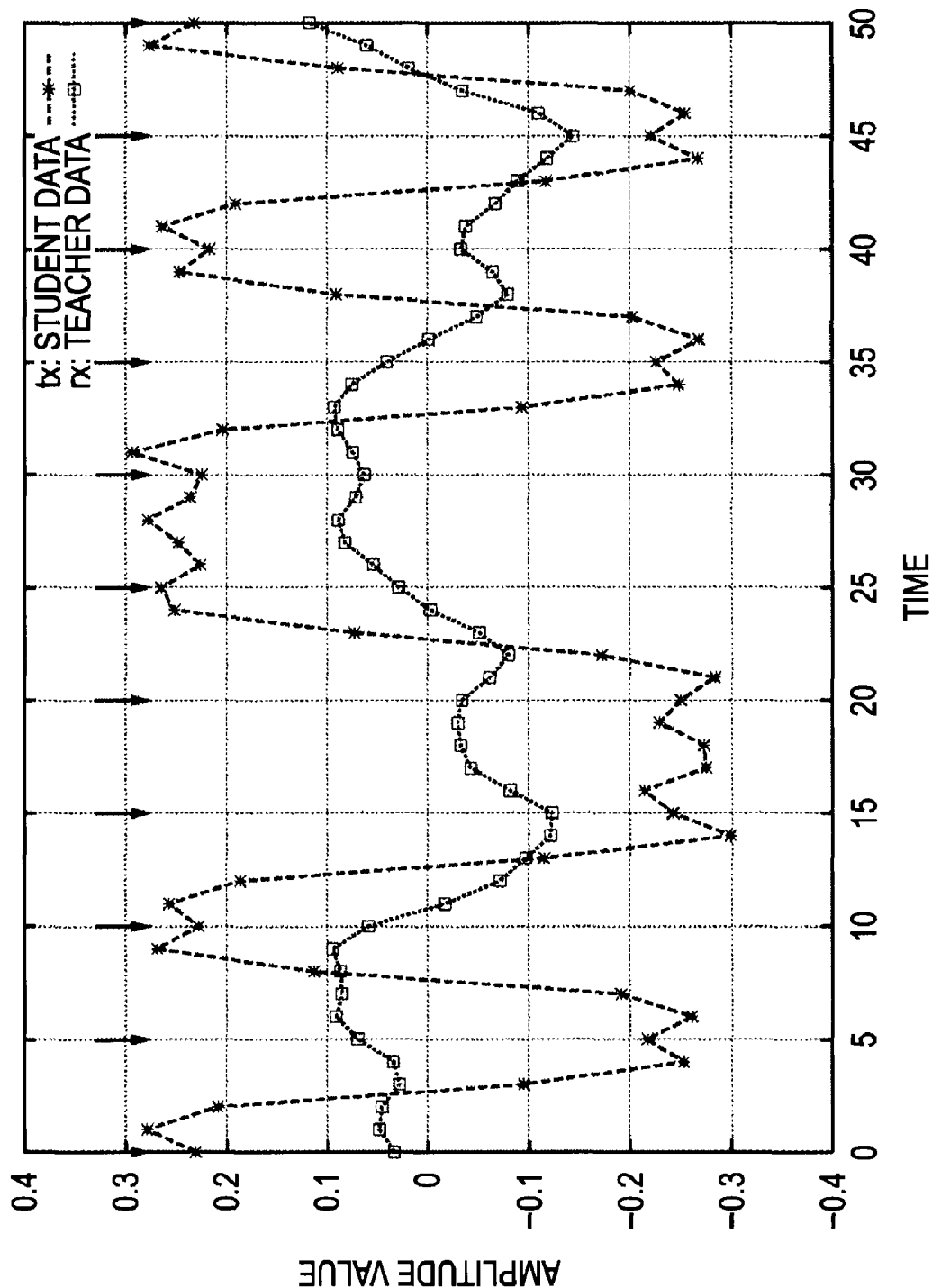
FIG. 14 is a graph showing one example of data used for learning transmission-channel characteristics.

The data input to the transmission-channel learning section 44 and used for learning the transmission-channel characteristics have, for example, characteristics shown in FIG. 14.

In FIG. 14, the horizontal axis indicates a time axis and the time passes from the left-hand side in the figure to the right-hand side. The vertical axis indicates the amplitude values of the student data and the teacher data, and the higher or lower it goes in the figure, the greater the amplitude is.

As shown in FIG. 14, comparison between the waveform of reception data serving as the teacher data and the waveform of transmission data serving as the student data shows that the teacher data deteriorates due to an influence of the transmission channel and has a smaller amplitude than the student data.

Downward arrows given at sampling times, 0, 5, 10, and 50 in FIG. 14 indicate normal bit timings. In the present embodiment, sampling that is typically performed at a time is performed five times, that is, oversampling is performed.

Referring back to FIG. 13, the transmission-channel learning section 44 determines the transmission-channel profile through learning using, for example, a least-squares method by using student data and teacher data as shown in FIG. 14.

Figure 15:
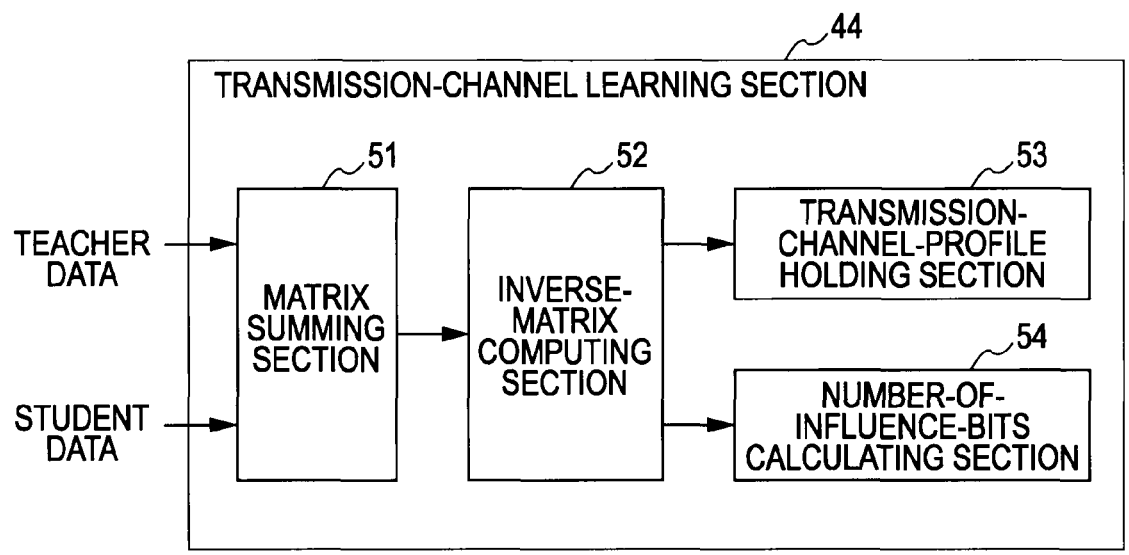
FIG. 15 is an example of a detailed configuration of a transmission-channel learning section.

As shown in FIG. 15, the transmission-channel learning section 44 includes a matrix summing section 51, an inverse-matrix computing section 52, a transmission-channel-profile holding section 53, and a number-of-influence-bits calculating section 54.

The matrix summing section 51 and the inverse-matrix computing section 52 in the transmission-channel learning section 44 computes the transmission-channel profile. First, a concept of the least-squares method that the transmission-channel learning section 44 uses for the learning will be described with reference to FIG. 16.

Figure 16:
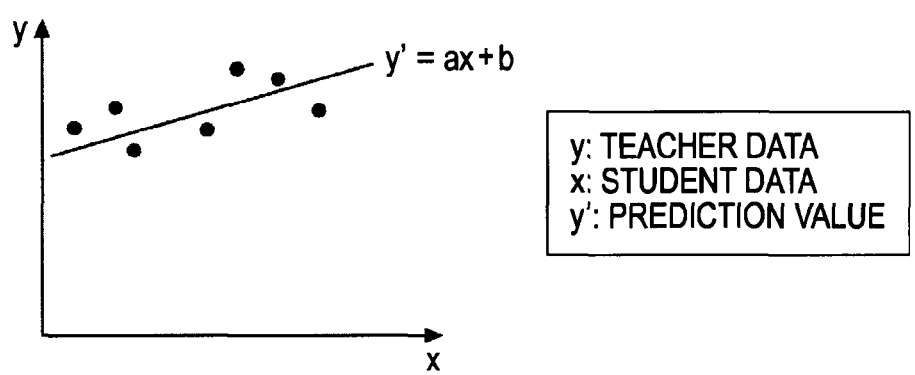
FIG. 16 is a graph illustrating a concept of a least-squares method used for the learning.

In FIG. 16, the horizontal axis indicates the student data and the vertical axis indicates the teacher data. FIG. 16 shows seven points represented by the student data and the teacher data associated with each other and a straight line that best fits the seven points. The straight line is expressed by the linear first-order prediction equation:

$$y' = a \cdot x + b \quad (1)$$

where y' indicates a prediction value, x indicates the student data x, and a and b indicate coefficients.

Assuming that a prediction error e for the prediction value y' obtained from equation (1) and the teacher data y is given by e=y−y', the sum E of squared errors of the prediction errors is given by:

$$E = \sum_{samples} (y - a \cdot x - b)^2 \quad (2)$$

where "samples" in equation (2) represents the number of samples. For example, in the example shown in FIG. 16, the number of samples is seven.

The least squares method is used to determine the coefficients a and b so that the sum E of squared errors in equation (2) becomes minimum. Specifically, computation is performed on equation (2) so that partial differential values of the coefficients a and b become zero, as shown by:

$$\frac{\partial E}{\partial a} = 0 \quad (3)$$

$$\frac{\partial E}{\partial b} = 0 \quad (4)$$

Since equations (3) and (4) are first-order equations, the coefficients a and b can be determined from equations (3) and (4).

Using such a least-squares method, the transmission-channel learning section 44 determines the transmission-channel profile.

The learning apparatus 31 receives a signal (hereinafter, may be referred to as a "test pattern signal") having a combination of bits that take preset values, such as [1, 0, 0, 0, 0] or [1, 1, 1, 1, 0], multiple times, and performs statistic processing on the waveform of the current bit resulting from the reception. By doing so, on the basis of the values of bits transmitted before the current bit, it is possible to obtain characteristics (i.e., the transmission-channel profile) of distortion that occurs in the waveform expressed by the signal value of the current bit.

Next, the teacher data and student data that the transmission-channel learning section 44 uses for the learning will be described with reference to FIGS. 17 and 18.

Figure 17:
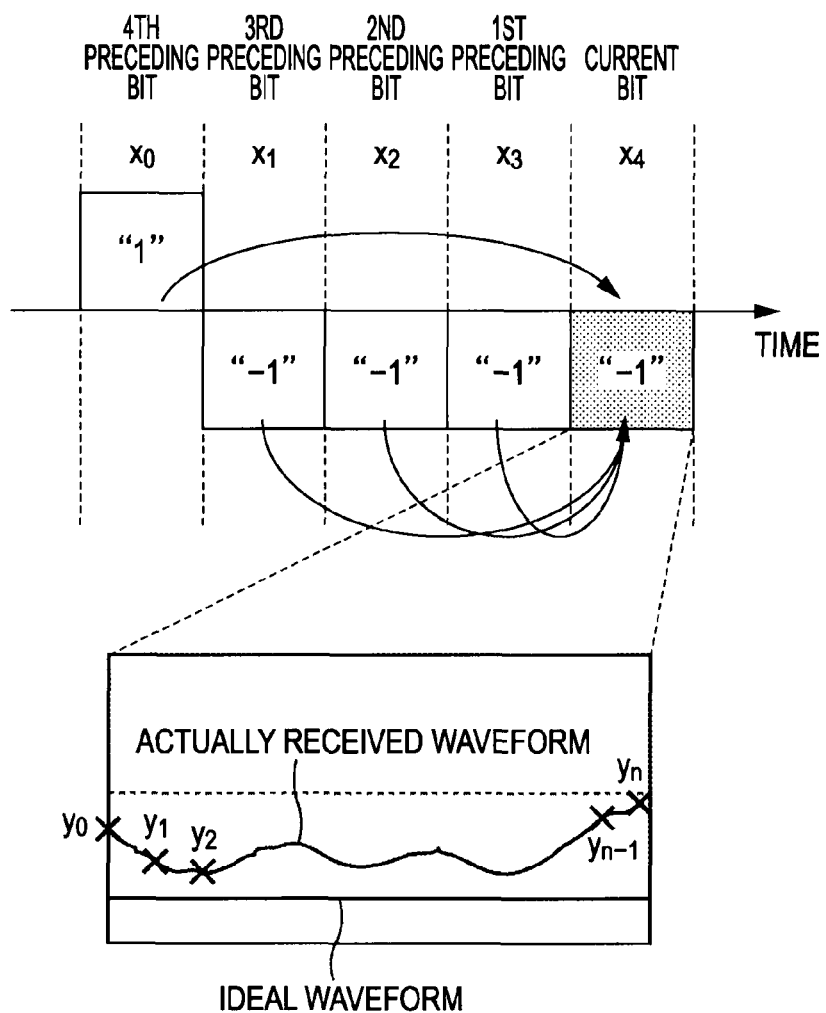
FIG. 17 illustrates teacher data and student data used for the learning.
Figure 18:
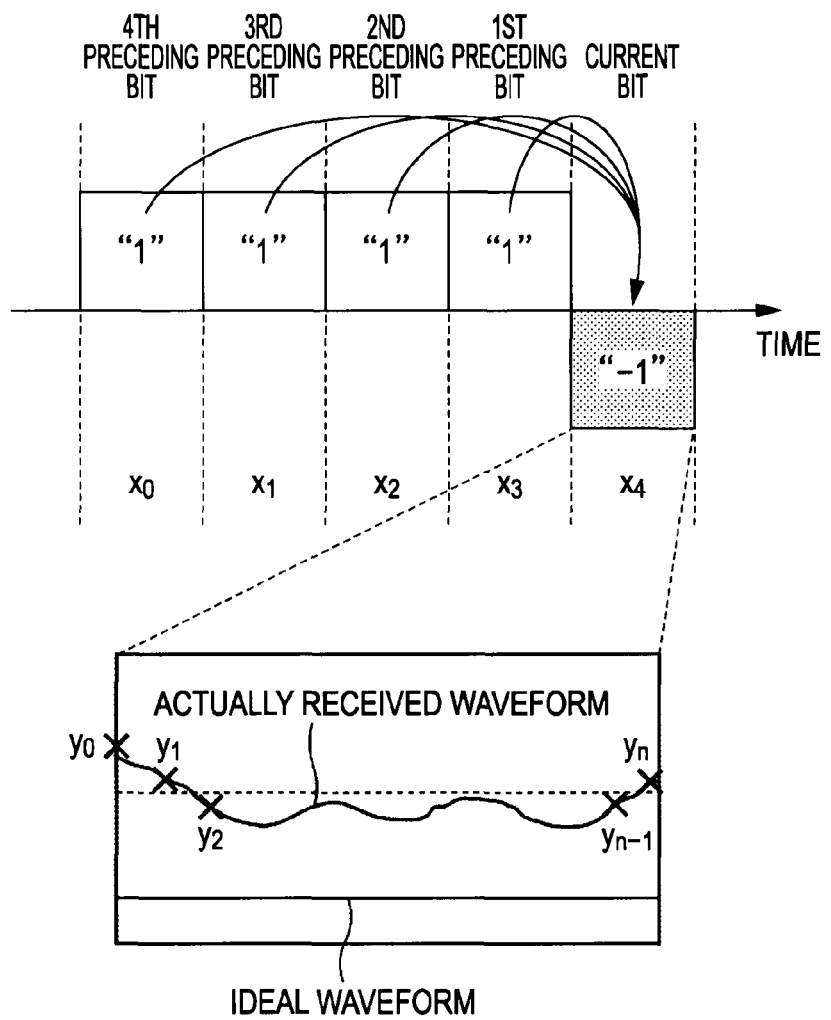
FIG. 18 illustrates teacher data and student data used for the learning.

FIG. 17 shows a waveform of the current bit obtained from a test pattern signal "1, 0, 0, 0, 0", and FIG. 18 shows a waveform of the current bit obtained from a test pattern signal "1, 1, 1, 1, 0".

As shown in FIGS. 17 and 18, the waveform of the current bit exhibits a straight line (an ideal waveform) if there is no influence of delayed transmission of bits transmitted before the current bit. However, the waveform actually received through wireless communication, for example, in the housing is distorted.

The values of the bits of a test pattern signal "$x_0, x_1, x_2, x_3, x_4$" are used as the student data. The waveform of the current bit obtained by actually receiving the test pattern signal "$x_0, x_1, x_2, x_3, x_4$" through wireless communication in the housing is sampled at, for example, n points, and the resulting sampling values "$y_0, y_1, y_2,$ and $y_n$" are used as the teacher data.

Given that prediction coefficients are $C_{0,0}, C_{0,1}, \ldots, C_{1,0}, C_{1,1}, \ldots,$ and $C_{n,4}$ for determining prediction values y' from the student data $x_0$ to $x_4$, prediction equations for determining the prediction values y' are expressed by:

$$y'_0 = c_{0,0} \times x_0 + c_{0,1} \times x_1 + c_{0,2} \times x_2 + c_{0,3} \times x_3 + c_{0,4} \times x_4 \quad (5)$$

$$y'_1 = c_{1,0} \times x_0 + c_{1,1} \times x_1 + c_{1,2} \times x_2 + c_{1,3} \times x_3 + c_{1,4} \times x_4$$

$$y'_2 = c_{2,0} \times x_0 + c_{2,1} \times x_1 + c_{2,2} \times x_2 + c_{2,3} \times x_3 + c_{2,4} \times x_4$$

$$\cdot = \ldots \ldots \ldots \ldots \ldots$$

$$\cdot = \ldots \ldots \ldots \ldots \ldots$$

$$y'_n = c_{n,0} \times x_0 + c_{n,1} \times x_1 + c_{n,2} \times x_2 + c_{n,3} \times x_3 + c_{n,4} \times x_4$$

Of subscripts of the prediction coefficients C, subscripts (0 to n) at the left side of the commas indicate that the prediction coefficients correspond to phase positions (n sampling points) of the waveform of the current bit and subscriptions (0 to 4) at the right side of the commas indicate that the prediction coefficients correspond to the student data $x_0$ to $x_4$.

A prediction error $e_n$ between the teacher data $y_n$ and the prediction value $y_n'$ at each phase position n, the prediction value $y_n'$ being determined from equations (5), is given by:

$$e_n = y_n - y'_n = y_n - \sum_{i=0}^{4} c_{n,i} \cdot x_i \quad (6)$$

A squared error $E_n$ is obtained by summing the prediction errors $e_n$ determined from equation (6), the number of prediction errors corresponding to the number of pieces of the teacher data $y_n$ sampled with respect to the student data $X_0$ to $X_4$, and is given by:

$$E_n = \sum_{samples} e_n^2 \quad (7)$$

$$= \sum_{samples} \left( y_n - \sum_{i=0}^{4} c_{n,i} \cdot x_i \right)^2$$

-continued $$= \sum_{samples} \left( y_n^2 - 2 \cdot y_n \cdot \sum_{i=0}^{4} c_{n,i} \cdot x_i + \left( \sum_{i=0}^{4} c_{n,i} \cdot x_i \right)^2 \right)$$

where "samples" in equation (7) indicates the number of pairs of the student data and teacher data input to the transmission-channel learning section 44. For example, when each test pattern signal is a 5-bit signal, as shown in FIGS. 17 and 18, and the waveform of the current bit is sampled at n points, the samples is 5×n.

The transmission-channel learning section 44 performs computation so that all partial differential values with prediction coefficients $C_{n,i}$ for the sum $E_n$ of squared errors in equation (7) are zero, that is, performs computation for solving the prediction coefficients $C_{n,i}$ so as to satisfy:

$$\frac{\partial E_n}{\partial c_{n,i}} = 2 \sum_{samples} \frac{\partial e_n}{\partial c_{n,i}} e_n = 2 \sum_{samples} x_i \cdot e_n \qquad (8)$$

$$= 2 \sum_{samples} \left( x_i \cdot \left( y_n - \sum_{j=0}^{4} c_{n,j} \cdot x_j \right) \right) = 0$$

Expansion of equation (8) yields:

$$\sum_{samples} \sum_{j=0}^{4} x_i \cdot x_j \cdot c_{n,j} = \sum_{samples} y_n \cdot x_i \qquad (9)$$

For equation (9), the transmission-channel learning section 44 performs computation to solve the prediction coefficients $C_{n,i}$ so that a total of 5×n equations, where n=0 to n and i=0 to 4, hold true. Given s as samples, when equation (9) is expressed with a determinant so that all of n=0 to n and i=0 to 4 in equation (9) are represented, equation (9) is given by:

$$\begin{bmatrix} \sum_s x_0 \cdot x_0 & \sum_s x_0 \cdot x_1 & \sum_s x_0 \cdot x_2 & \sum_s x_0 \cdot x_3 & \sum_s x_0 \cdot x_4 \\ \sum_s x_1 \cdot x_0 & \sum_s x_1 \cdot x_1 & \sum_s x_1 \cdot x_2 & \sum_s x_1 \cdot x_3 & \sum_s x_1 \cdot x_4 \\ \cdots & \cdots & \cdots & \cdots & \cdots \\ \sum_s x_4 \cdot x_0 & \sum_s x_4 \cdot x_1 & \sum_s x_4 \cdot x_2 & \sum_s x_4 \cdot x_3 & \sum_s x_4 \cdot x_4 \end{bmatrix} \qquad (10)$$

$$\begin{bmatrix} c_{0,0} & c_{1,0} & \cdots & c_{n,0} \\ c_{0,1} & c_{1,1} & \cdots & c_{n,1} \\ \cdots & \cdots & \cdots & \cdots \\ c_{0,4} & c_{1,4} & \cdots & c_{n,4} \end{bmatrix} =$$

$$\begin{bmatrix} \sum_s y_0 \cdot x_0 & \sum_s y_1 \cdot x_0 & \sum_s y_2 \cdot x_0 & \cdots & \sum_s y_n \cdot x_0 \\ \sum_s y_0 \cdot x_1 & \sum_s y_1 \cdot x_1 & \sum_s y_2 \cdot x_1 & \cdots & \sum_s y_n \cdot x_1 \\ \cdots & \cdots & \cdots & \cdots & \cdots \\ \sum_s y_0 \cdot x_4 & \sum_s y_1 \cdot x_4 & \sum_s y_2 \cdot x_4 & \cdots & \sum_s y_n \cdot x_4 \end{bmatrix}$$

When equation (10) is expressed as A·W=B, matrix A and matrix B are known since the student data and the teacher data are substituted thereinto and matrix W expressed by the prediction coefficients $C_{n,i}$ is unknown.

The transmission-channel learning section 44 substitutes (sums) the student data and the teacher data (e.g., the student data and teacher data shown in FIG. 14) into equation (10) and determines matrix W using, for example, a typical matrix solution, such as Gaussian elimination. By doing so, the transmission-channel learning section 44 can obtain the prediction coefficients $C_{n,i}$, i.e., the transmission-channel profile indicating transmission-channel characteristics.

As described above, the transmission-channel learning section 44 obtains the transmission-channel profile by performing learning using the student data and the teacher data. More specifically, the transmission-channel learning section 44 obtains the transmission-channel profile, for example, in the following manner.

As shown in FIG. 15, in the transmission-channel learning section 44, the matrix summing section 51 determines a determinant of equation (10) by using the teacher data and the student data and the inverse-matrix computing section 52 solves the determined determinant for equation (10) to obtain the transmission-channel profile. The transmission-channel profile obtained by the inverse-matrix computing section 52 is supplied to the transmission-channel-profile holding section 53 and is held thereby and is also supplied to the number-of-influence-bits calculating section 54.

On the basis of the transmission-channel characteristics indicated by the transmission-channel profile supplied from the inverse-matrix computing section 52, the number-of-influence-bits calculating section 54 calculates the number $N_c$ of valid carrier-wave signals, the number being considered to be in a valid range during selection of an optimum carrier-wave pattern. The processing that the number-of-influence-bits calculating section 54 performs to determine the number $N_c$ of valid carrier-wave signals is described below in detail.

Although not shown, when the test pattern signal is classified into a predetermined class, a class classifying section (not shown) generates a class code indicating a classified class and supplies the class code to the transmission-channel learning section 44. In the transmission-channel learning section 44, equation (10) is an equation for one class. Thus, for example, when the number of classified classes is m, m determinants are prepared according to the respective classes.

The learning apparatus 31 can effectively determine the prediction coefficient $C_{n,i}$ by performing computation using a sufficient number of prediction coefficients $C_{n,i}$ and a sufficient number of learning-pair samples (i.e., teacher data and corresponding student data). However, even if the number of pieces of learning-pair data is small, the learning apparatus 31 can determine the prediction coefficient $C_{n,i}$ by using some constraint condition for obtaining matrix W.

Figure 19:
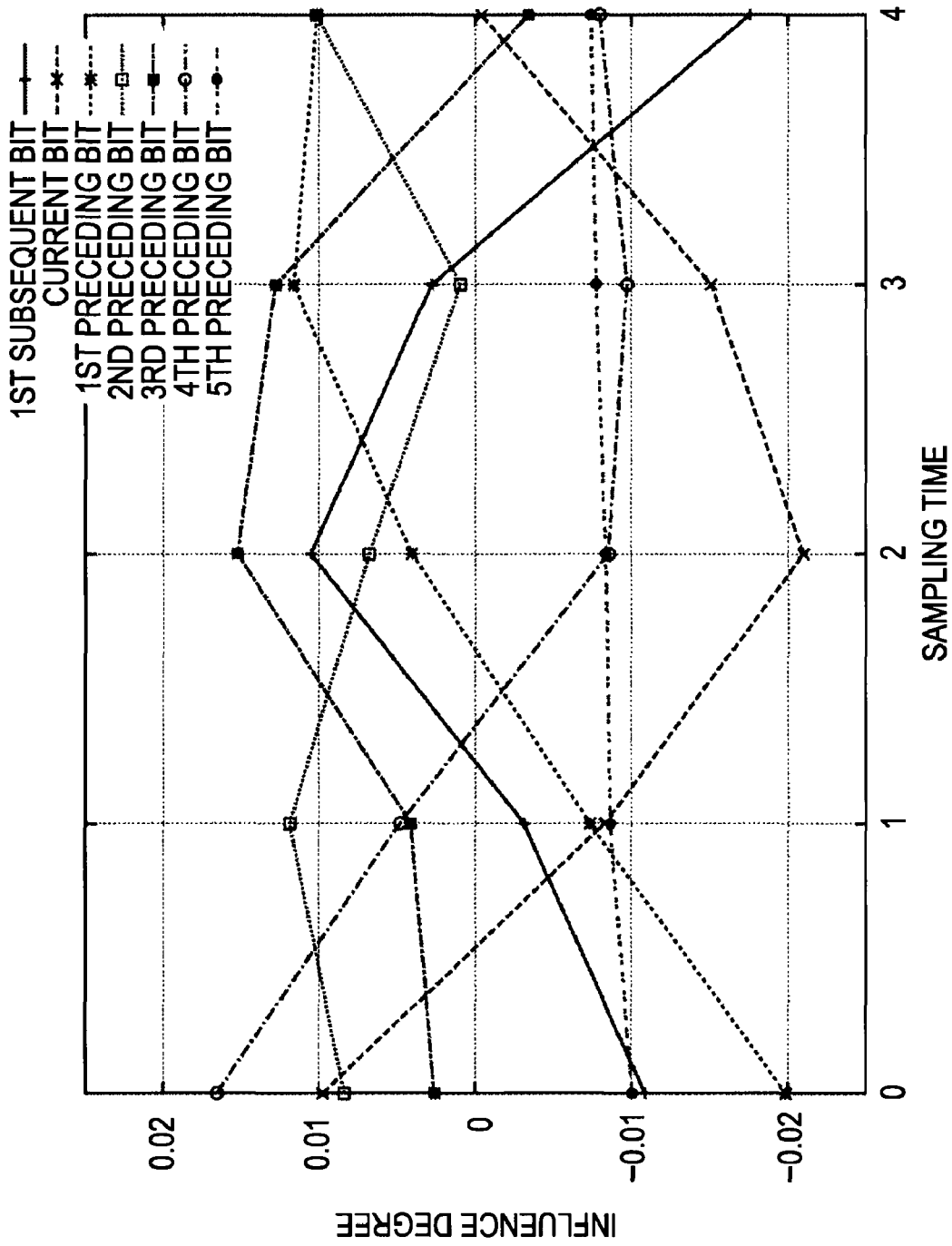
FIG. 19 is a graph illustrating an example of a transmission-channel profile.

FIG. 19 shows an example of the transmission-channel profile obtained as described above.

In FIG. 19, the horizontal axis indicates sampling time and the vertical axis indicates an influence degree, and the higher it goes, the greater the value is. In FIG. 19, different types of lines represent relative position bits relative to the current bit. As shown by the line types at the upper right in FIG. 19, seven lines representing influence degrees of the first subsequent bit, the current bit, the first preceding bit, the second preceding bit, the third preceding bit, the fourth preceding bit, and the fifth preceding bit are shown (the reason why the first subsequent bit is also considered is described below). The term "relative position bit" indicates how many bits before or after the current bit the data of interest is.

In FIG. 19, the sampling time indicates 0 to 4, which means that sampling is performed five times for each bit. That is, for example, the current bit shown in FIG. 17 and the current bit shown in FIG. 19 correspond to each other, and the sampling time shown in FIG. 19 indicates that the waveform of the current bit shown in FIG. 17 is sampled at five points. Each of the other bits was sampled at five points, in the same manner as the current bit.

Figure 20:
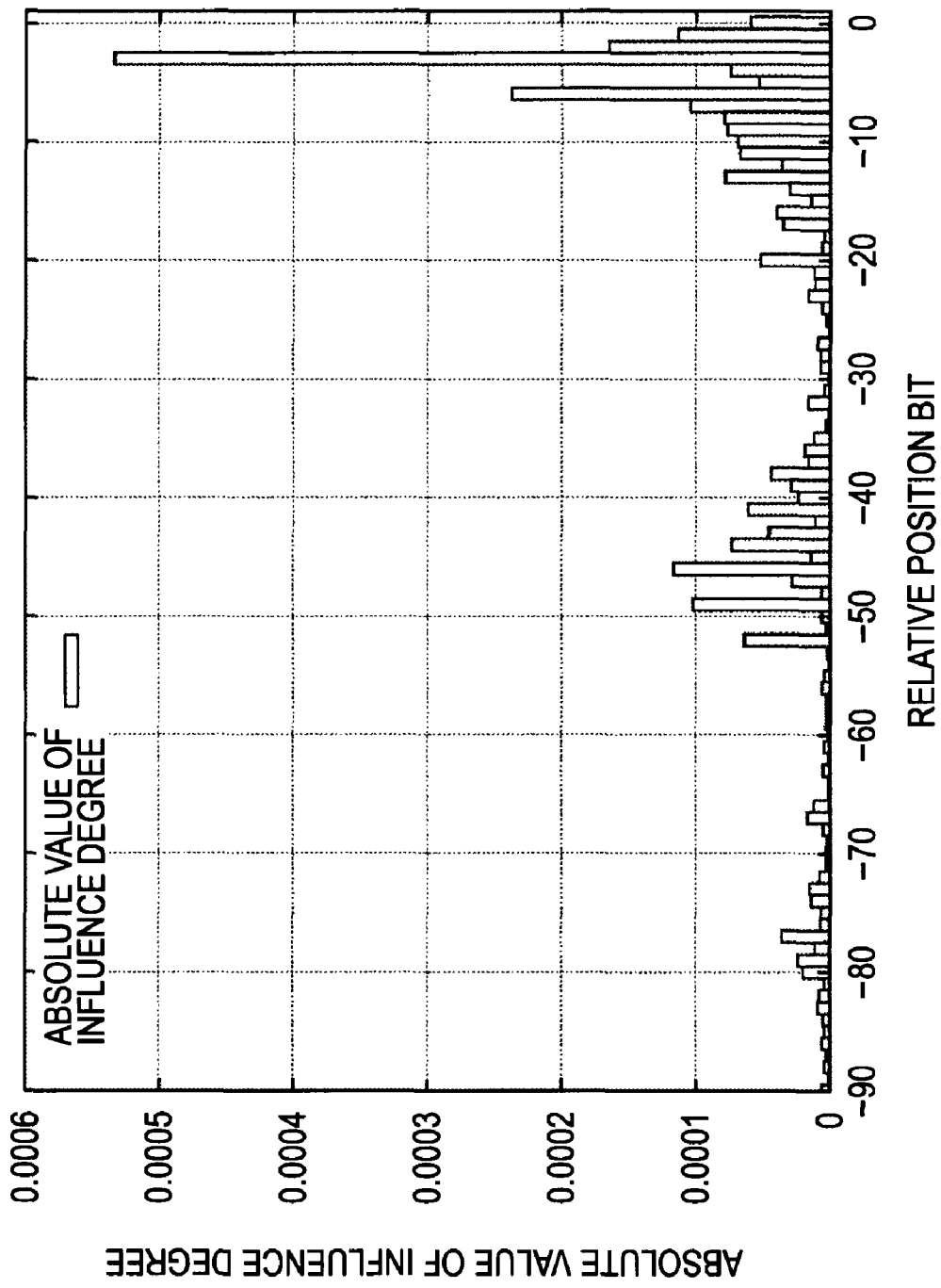
FIG. 20 is a graph showing an example of the range of the number of influencing bits.

FIG. 20 shows that absolute values of the influence degrees are plotted for each relative position bit. That is, in FIG. 20, the horizontal axis indicates the relative position bit, and a bit that is further from the right side to the left side in FIG. 20 indicates that it is located further away from the current bit. The vertical axis indicates the absolute value of the influence degree, and the higher it goes in FIG. 20, the greater the value is.

The absolute value of the influence degree can be determined by applying equation (11) to the influence degree i shown in FIG. 19.

$$\text{Absolute Value of Influence Degree} = \sum_{i=0}^{4} (\text{Influence } Degree_i)^2 \quad (11)$$

where i indicates sampling time. For example, when the sampling time in FIG. 19 is 0 to 4, i is set to 0 to 4.

In FIG. 20, comparison of the absolute values of the influence degrees of the respective relative position bits shows that data transmitted at the third preceding bit has the largest influence degree on the reception data and data transmitted at the sixth preceding bit has the second largest influence degree. In addition, it can be understood that data up to about 80 preceding bits have relatively large influence degrees on the reception data. In this case, the number-of-influence-bits calculating section 54 shown in FIG. 15 sets, for example, 80 bits as the number $N_c$ of valid carrier-wave signals.

With respect to the transmission-channel characteristics indicated by the transmission-channel profile supplied from the inverse-matrix computing section 52, the number-of-influence-bits calculating section 54 calculates the absolute values of the influence degrees by using equation (11) noted above and determines the number $N_c$ of valid carrier-wave signals. A valid range for the number $N_c$ of valid carrier-wave signals can be set to a range in which the absolute value of the influence degree exceeds a predetermined threshold or a range in which the cumulative sum of the influence degrees exceeds a predetermined threshold.

The reason why not only bits prior to the current bit but also the first subsequent bit is considered in FIG. 19 will now be described.

Figure 21:
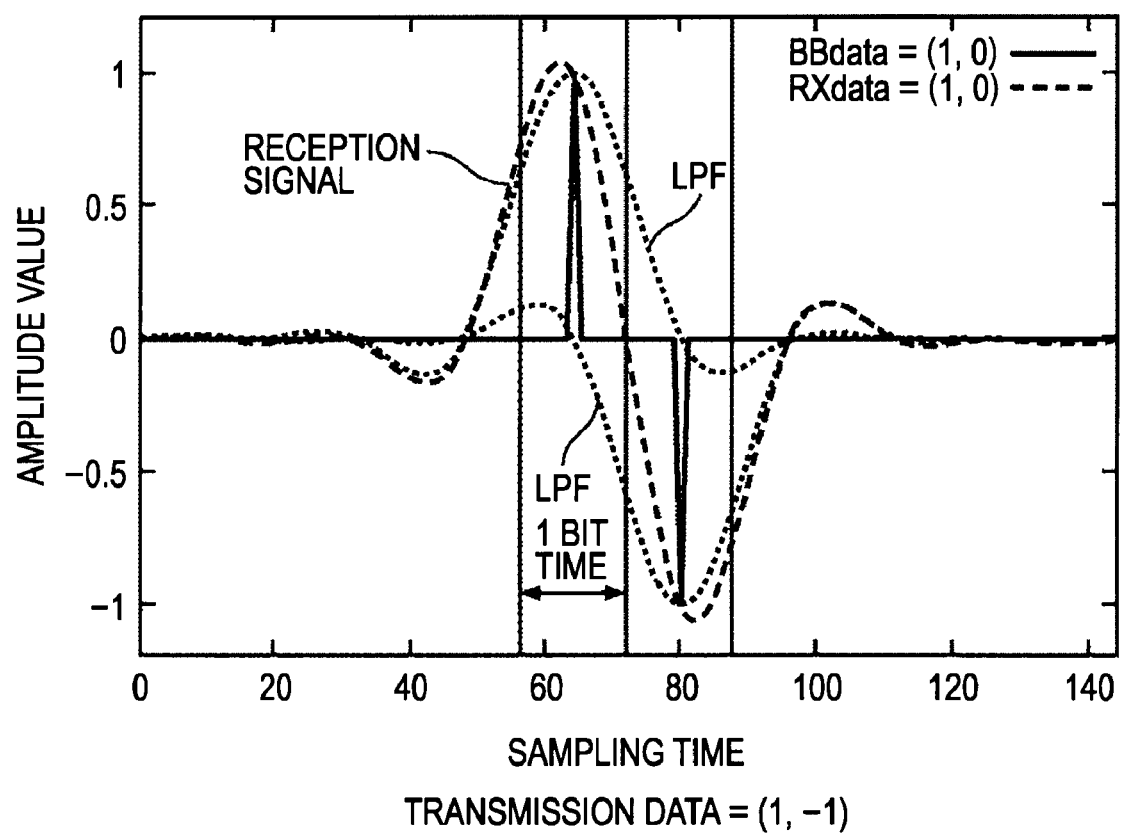
FIG. 21 is a graph illustrating a reason for using data of a first subsequent bit.
Figure 22:
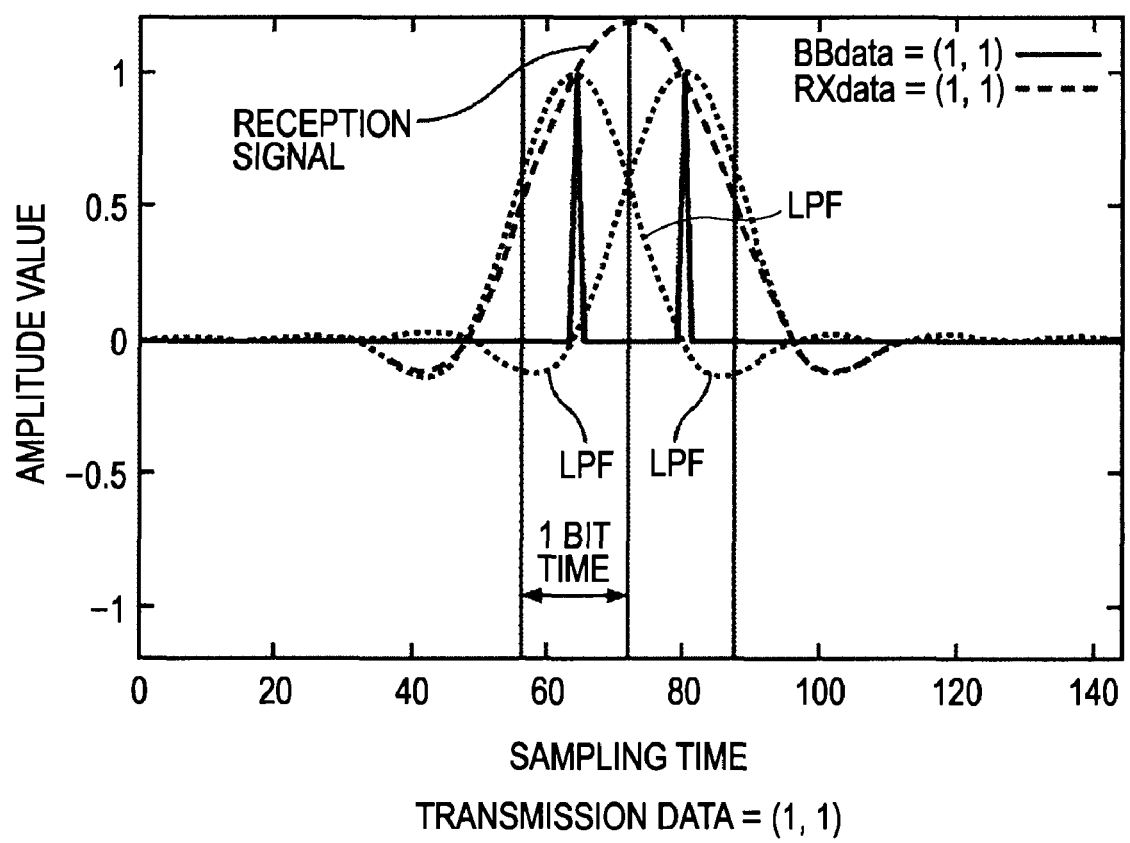
FIG. 22 is a graph illustrating the reason for using data of the first subsequent bit.

FIGS. 21 and 22 show the waveforms of outputs obtained through an ideal low-pass filter (LPF) when the transmission data is (1, −1) and (1, 1), respectively.

In FIGS. 21 and 22, the horizontal axis indicates a time axis and the time passes from the left-hand side in the figure to the right-hand side. The vertical axis indicates the amplitude value of each signal, and the higher or lower it goes, the greater the amplitude is. The relationship of the axes also applies to the graph described below and shown in FIG. 23.

As shown in FIG. 21, for the case in which the transmission data is (1, −1), a reception signal indicated by a broken line has been passed through the ideal LPF (dotted lines), and thus the output waveform first exhibits an amplitude value of 1 and then exhibits −1 after one-bit time, as indicated by a solid line.

As shown in FIG. 22, for the case in which the transmission data is (1, 1), the output waveform of a reception signal first exhibits an amplitude value of 1 and then exhibits 1 after one-bit time, as indicated by a solid line.

When the two reception signals are compared and attention is given to a preceding one of the two bits of the transmission data, the waveform of the preceding bit is significantly changed by the pattern of the subsequent bit. More specifically, comparison between the waveform of the reception signal in FIG. 21 when a bit of interest is "1" and the subsequent bit is "−1" and the waveform of the reception signal in FIG. 22 when a bit of interest is "1" and the subsequent bit is 11111 shows that the waveforms of the bits "1" of interest are changed by the patterns of the subsequent bits.

Figure 23:
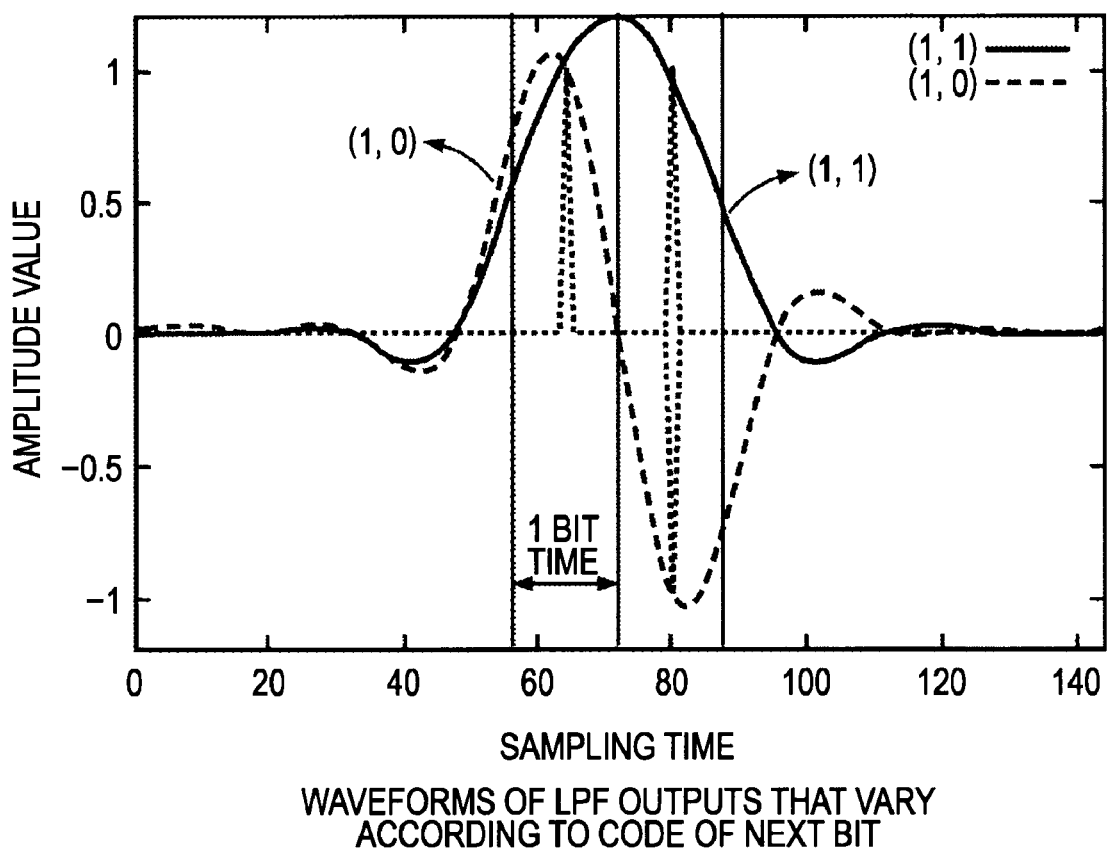
FIG. 23 is a graph illustrating the reason for using data of the first subsequent bit.

FIG. 23 shows comparison of waveforms with attention being given to only two ideal LPF outputs described above with reference to FIGS. 21 and 22. That is, in FIG. 23, the broken line indicates the waveform of an output when the transmission data is (1, −1) and the solid line indicates the waveform of an output when the transmission data is (1, 1).

As described above, in the present embodiment, an influence of the LPF is taken into account and the bit next to a bit of interest is also incorporated into the learning. By doing so, it is possible to more effectively determine an optimum carrier-wave pattern and a sampling position. In this case, the arrangement may be such that the reception data (teacher data) subjected to transmission distortion and the PRBS data (student data) generated by the receiving side are temporarily input to a shift register for delay and the resulting data delayed by 1 bit is used to perform the learning.

A description is now given of a method for selecting an optimum carrier-wave pattern and a sampling position.

In the present embodiment, a case in which a carrier-wave pattern for eight bits is contained in one symbol (1 bit of baseband data) will be described by way of example. That is, in this case, for example, when the baseband signal is 250 Mbps, the maximum frequency of the carrier wave is 1 GHz, when the baseband signal is 500 Mbps, the maximum frequency of the carrier wave is 2 GHz, and when the baseband signal is 1000 Mbps, the maximum frequency of the carrier wave is 4 GHz. The maximum frequency is obtained when 1 and 0 in all bits are alternately switched, such as [1, 0, 1, 0, 1, 0, 1, 0] or [0, 1, 0, 1, 0, 1, 0, 1]. The minimum frequency is obtained when all bits are expressed by a DC representation, such as [1, 1, 1, 1, 1, 1, 1, 1] or [0, 0, 0, 0, 0, 0, 0, 0].

As described above with reference to the example shown in FIG. 20, when the number-of-influence-bits calculating section 54 sets, for example, 80 bits as the number $N_c$ of valid carrier-wave signals, this corresponds to 10 symbols in terms of a baseband signal rate.

Figure 24:
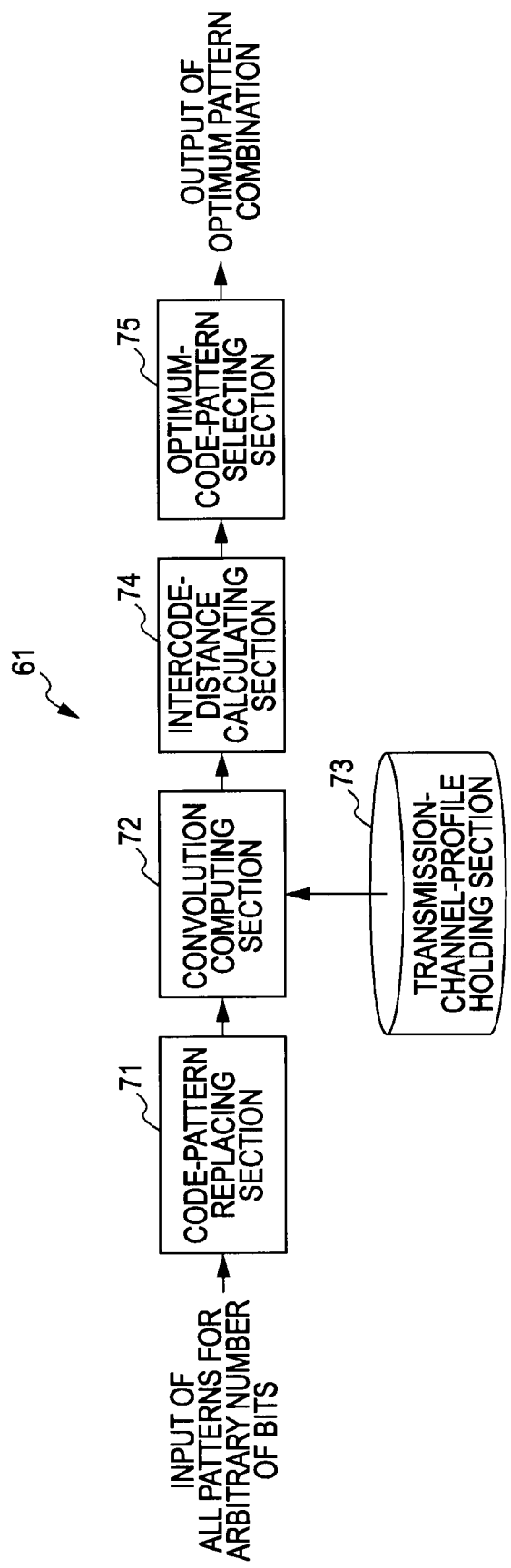
FIG. 24 is a diagram showing an example of the configuration of a pattern selecting apparatus.

FIG. 24 is a block diagram showing an example of the configuration of a pattern selecting apparatus for performing signal processing for extracting an optimum carrier-wave pattern combination and a sampling position.

As shown in FIG. 24, a pattern selecting apparatus 61 includes a code-pattern replacing section 71, a convolution computing section 72, a transmission-channel-profile holding section 73, an intercode-distance calculating section 74, and an optimum-code-pattern selecting section 75. In the present embodiment, the pattern selecting apparatus 61 can also be regarded as part of the learning apparatus 31 shown in FIG. 13. In this case, a pattern selecting section that is one processing section corresponding to the pattern selecting apparatus 61 is provided in the learning apparatus 31, and the transmission-channel-profile holding section 73 corresponds to the transmission-channel-profile holding section 53 shown in FIG. 15.

The code-pattern replacing section 71 replaces codes for 10 symbols of an input baseband signal with ptrn0, which is a carrier-wave pattern corresponding to code 0, and ptrn1, which is a carrier-wave pattern corresponding to code 1.

Figure 25:
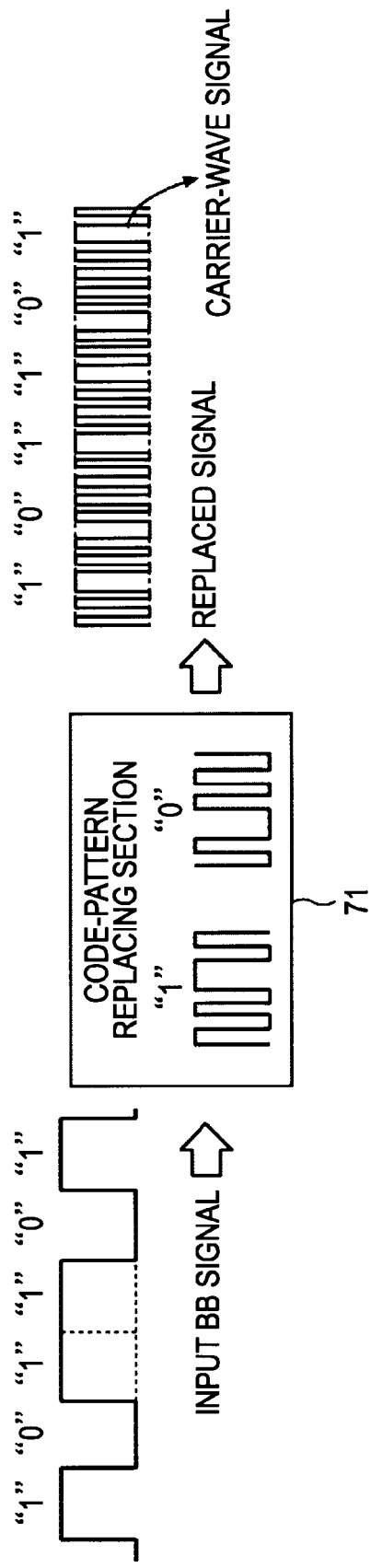
FIG. 25 illustrates details of processing performed by a code-pattern replacing section.

More specifically, as shown in FIG. 25, the code-pattern replacing section 71 replaces one symbol of an input baseband signal, such as "1", "0", "1", "1", "0", "1", . . . and so on with 8-bit ptrn0 or ptrn1 and outputs the resulting signal as a carrier-wave signal.

In this case, when the carrier-wave signal has a relationship of N bits relative to one symbol of the baseband signal, a pattern of $2^N \times 2^N$ is taken into account. In actual calculation, for example, (ptrn0, ptrn1)=(00001111, 11110000) and (ptrn0, ptrn1)=(11110000, 00001111) yield the same result. Thus, omission of the calculation or omission of calculation for the same pattern that satisfies ptrn0=ptrn1 makes it possible to reduce the amount of computation.

Referring back to FIG. 24, the ptrn0-and-ptrn1 signal converted from the input baseband signal are input to the convolution computing section 72. The convolution computing section 72 reads the transmission-channel profile, predetermined through the learning, from the transmission-channel-profile holding section 73, and predicts a waveform of the reception signal by using the transmission-channel profile and the converted ptrn0-and-ptrn1 signal.

Figure 26A:
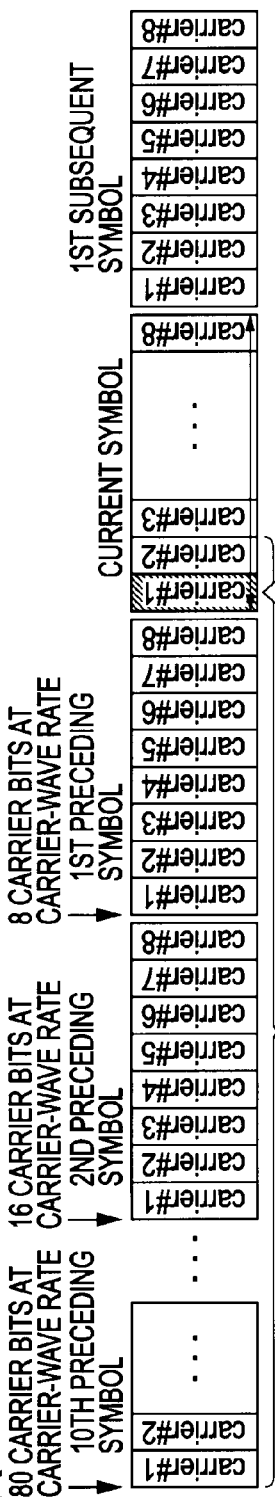
FIGS. 26A to 26C each show a relationship between a carrier-wave signal and a baseband signal.
Figure 26B:
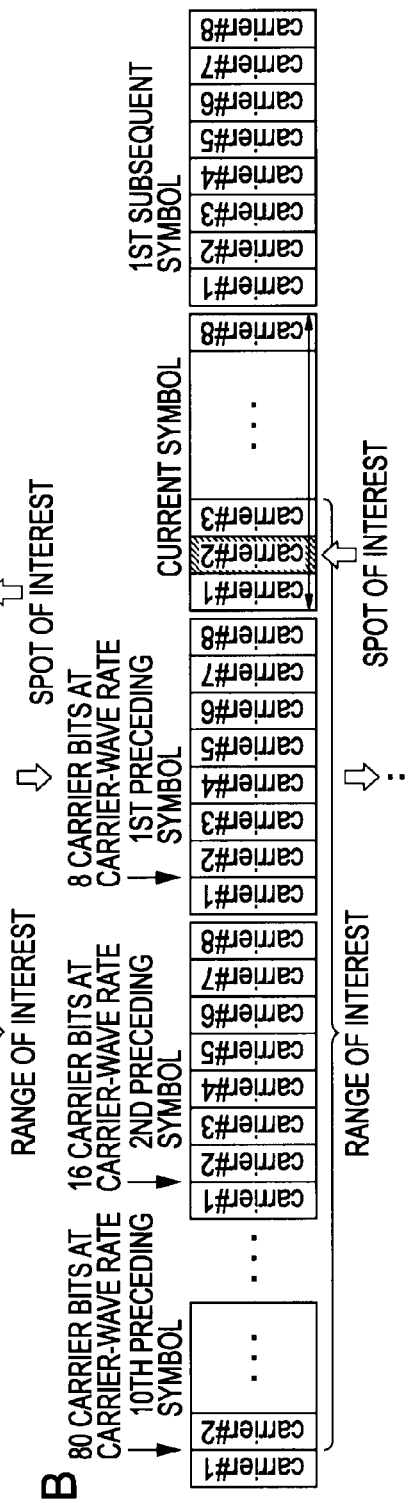
Figure 26C:
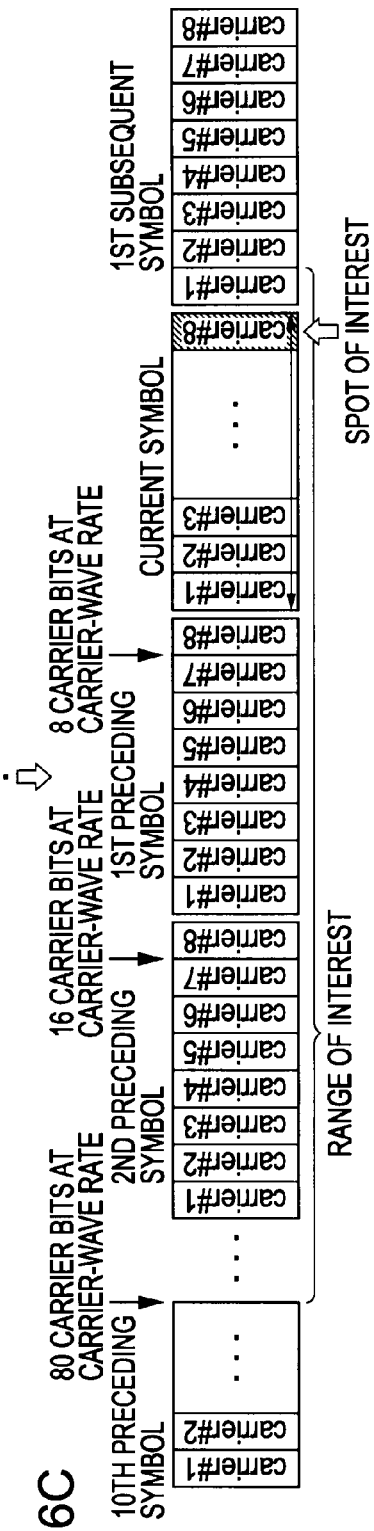

FIGS. 26A to 26C schematically each show a range of bits used for the computation.

In FIGS. 26A to 26C, one square indicates one carrier bit and one symbol has eight carrier bits (carrier #1 to carrier #8). That is, in FIGS. 26A to 26C, the symbols represent data and the carriers represent carrier waves.

In the example of FIGS. 26A to 26C, the number $N_c$ of valid carrier-wave signals is set to 80 bits at a carrier-wave rate. That is, in FIGS. 26A to 26C, a range of interest, which is the range of bits used during computation, is a range of 80 preceding bits to one subsequent bit when the spot of interest in the current symbol is a reference.

For example, as in the bit string shown in FIG. 26A, when carrier #1 in the current symbol is a spot of interest (indicated by a hatched square), the range of interest is the range of carrier #1 in the tenth preceding symbol to carrier #2 in the current symbol. The reason why the range of interest includes the first subsequent bit is as described above.

Subsequently, as in the bit string shown in FIG. 26B, when the spot of interest in the current symbol shifts rightward from carrier #1 to carrier #2 by one carrier bit, the range of interest moves rightward correspondingly by one carrier bit and thus becomes the range of carrier #2 in the tenth preceding symbol to carrier #3 in the current symbol.

Thereafter, when the spot of interest in the current symbol shifts rightward sequentially by one carrier bit, the range of interest correspondingly moves rightward sequentially by one carrier bit. As shown in the bit string in FIG. 26C, when the spot of interest shifts to carrier #8 in the current symbol, the range of interest becomes the range of carrier #1 in the ninth preceding symbol to carrier #1 in the first subsequent symbol.

The convolution computing section 72 determines a reception signal i through computation of:

$$\text{Reception Signal}_i = \sum_{j=-80}^{+1} (\text{Transmission Channel Profile}_j \times \text{Carrier-Wave Signal}_{i+j}) \quad (12)$$

where i indicates a carrier-wave signal position to be determined and j indicates the position of the number $N_c$ of valid carrier-wave signals. For example, in FIGS. 26A to 26C, i=0 to 7 and j is −80 bit to +1 bit.

Figure 27:
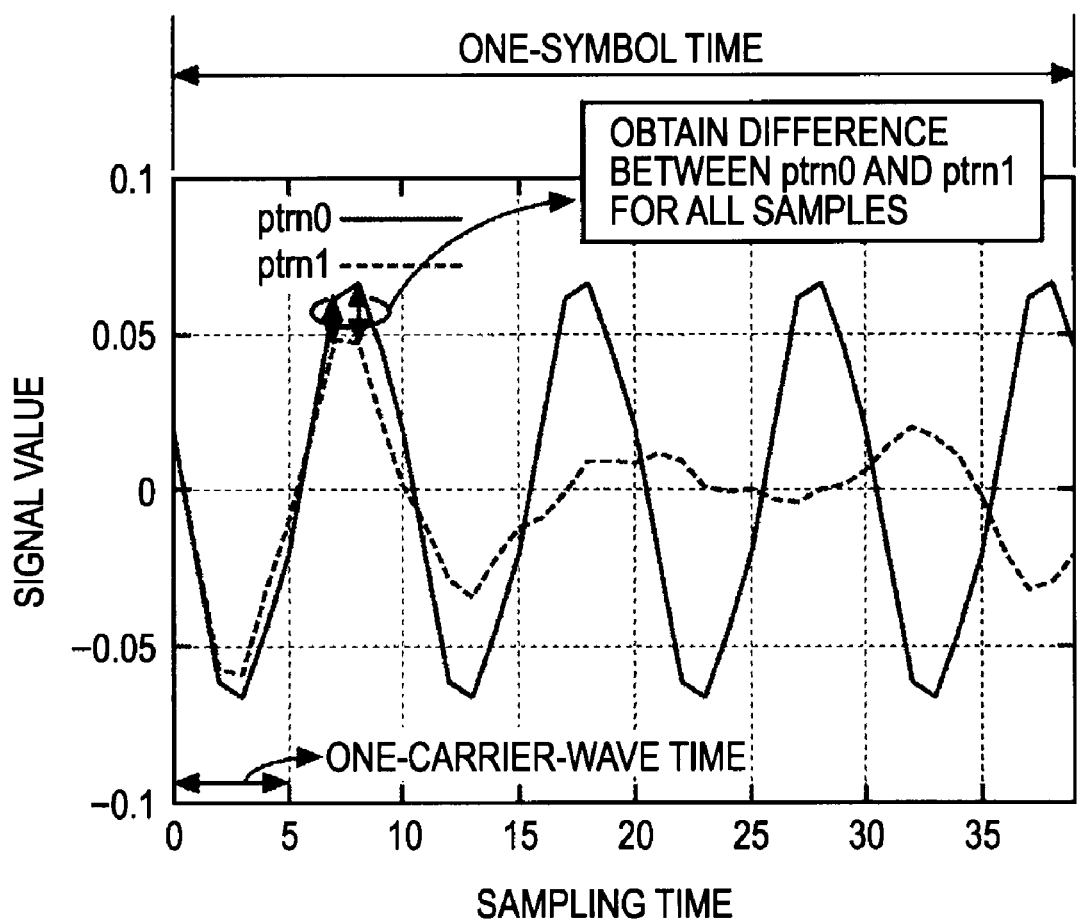
FIG. 27 is a graph showing an example of a distance (difference) between code 0 and code 1.
Figure 28:
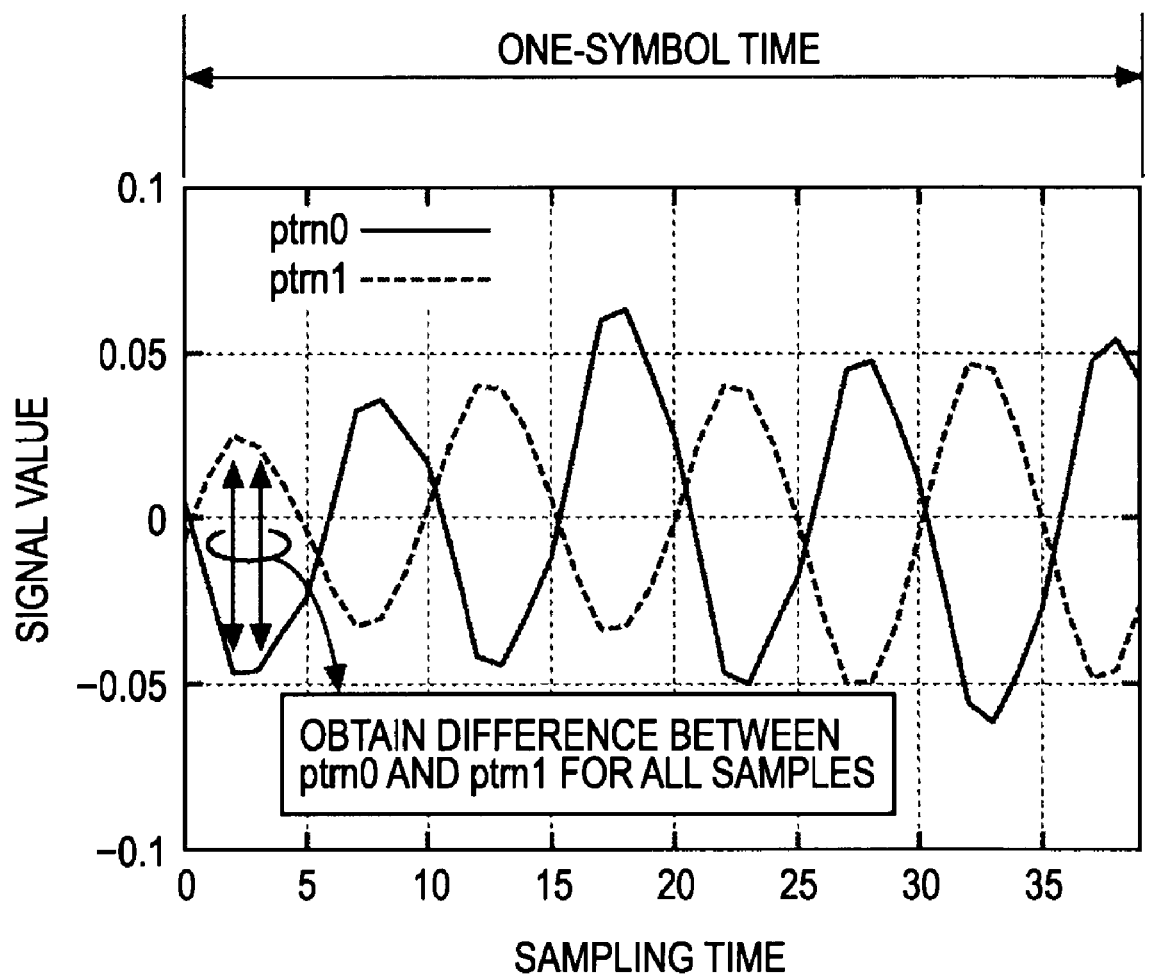
FIG. 28 is a graph showing an example of a distance (difference) between code 0 and code 1.

FIGS. 27 and 28 show examples of reception signals obtained from equation (12).

In FIGS. 27 and 28, the horizontal axis indicates a time axis and the time passes from the left-hand side in the figure to the right-hand side. The vertical axis indicates the signal value, and the higher it goes in the figures, the greater the value is.

FIG. 27 shows reception waveforms of the current symbol when all of 10 preceding symbols are 0, and the solid line in FIG. 27 represents a reception waveform for ptrn0 and the broken line represents a reception waveform for ptrn1. That is, FIG. 27 shows the waveforms of code 0 (ptrn0) and code 1 (ptrn1) in the current symbol when all of 10 preceding symbols are 0.

In FIG. 27, since a carrier-wave signal pattern for 8 bits is included in one symbol, one-symbol time corresponds to the time of eight carrier waves. Since sampling is performed five times for each one-carrier time, data are obtained at 40 (5×8) sampling positions per one-symbol time in FIG. 27. That is, it can be said that the current symbol has 40 samples.

FIG. 28 shows reception waveforms of the current symbol when the second preceding symbol is 1 and all other preceding symbols are 0, and as in FIG. 27, the solid line represents a reception waveform for ptrn0 and the broken line represents a reception waveform for ptrn1. That is, FIG. 28 shows the waveforms of code 0 (ptrn0) and code 1 (ptrn1) in the current symbol when the second preceding symbol is 1 and all other preceding symbols are 0.

Referring back to FIG. 24, the reception signal obtained by the convolution computing section 72 is input to the intercode-distance calculating section 74. Using the reception signal input from the convolution computing section 72, the intercode-distance calculating section 74 calculates the distance between codes. For example, the intercode distance can be determined by the following equation (13) or (14):

$$\text{Intercode Distance}_i = |ptrn0_i - ptrn1_i| \quad (13)$$

$$\text{Intercode Distance}_i = (ptrn0_i - ptrn1_i)^2 \quad (14)$$

where subscription i indicates the sampling position in a symbol.

The result of computation of equation (13) or (14), the computation being performed by the intercode-distance calculating section 74, corresponds to a difference between ptrn0 and ptrn1, as indicated by an arrow shown between ptrn0 and ptrn1 at the same sampling time in FIGS. 27 and 28. The intercode-distance calculating section 74 computes and obtains differences between ptrn0 and ptrn1 with respect to all samples.

Comparison between the waveforms in FIG. 27 and the waveforms in FIG. 28 shows that the intercede distances of the waveforms in FIG. 28 are larger since ptrn0 and ptrn1 have a reverse phase.

The intercode-distance calculating section 74 obtains intercode distances for all the baseband signal patterns, and determines an evaluation value obtained by summing the intercode distances through computation of, for example, equation (15) or (16):

$$\sum_{\text{All Baseband Signal Patterns}} \text{Intercode } Distance_i = \sum_{\text{All Baseband Signal Patterns}} |ptrn0_i - ptrn1_i| \quad (15)$$

$$\sum_{\text{All Baseband Signal Patterns}} \text{Intercode } Distance_i = \sum_{\text{All Baseband Signal Patterns}} (|ptrn0_i - ptrn1_i|)^2 \quad (16)$$

Figure 29:
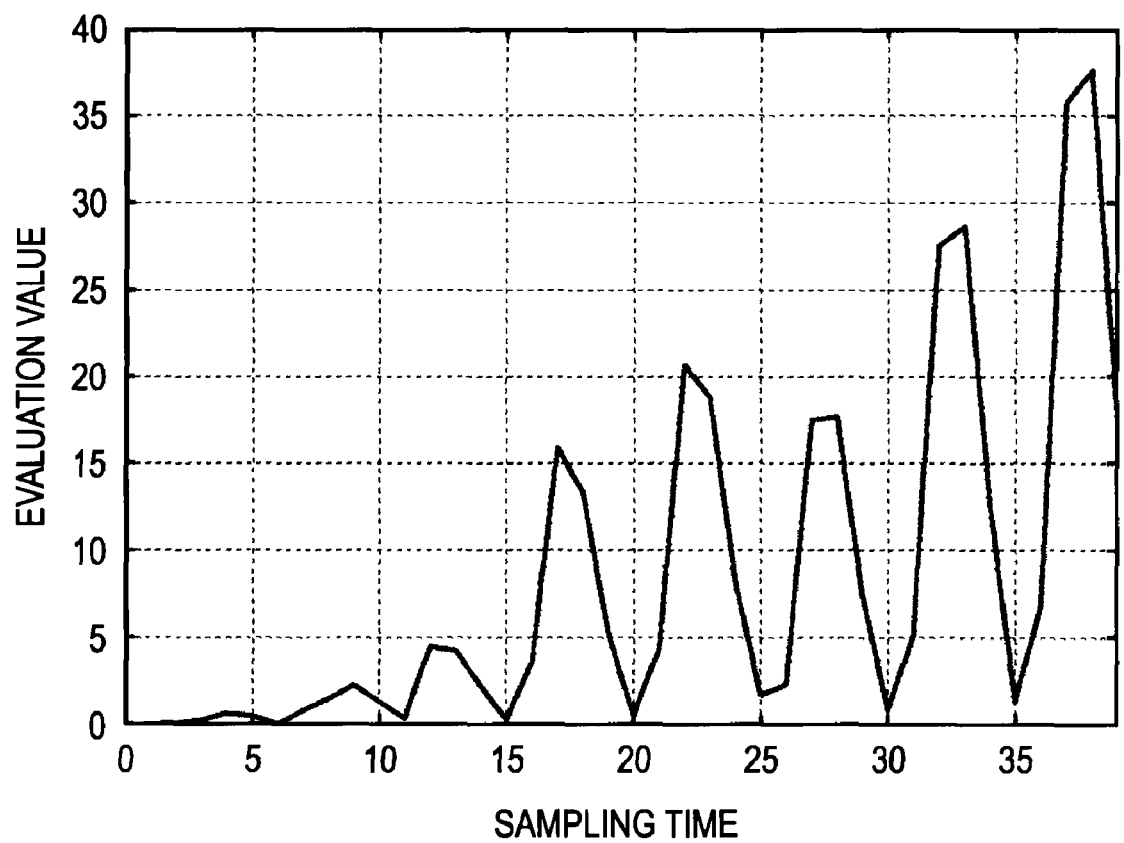
FIG. 29 is a graph showing an example of an intercede distance.
Figure 30:
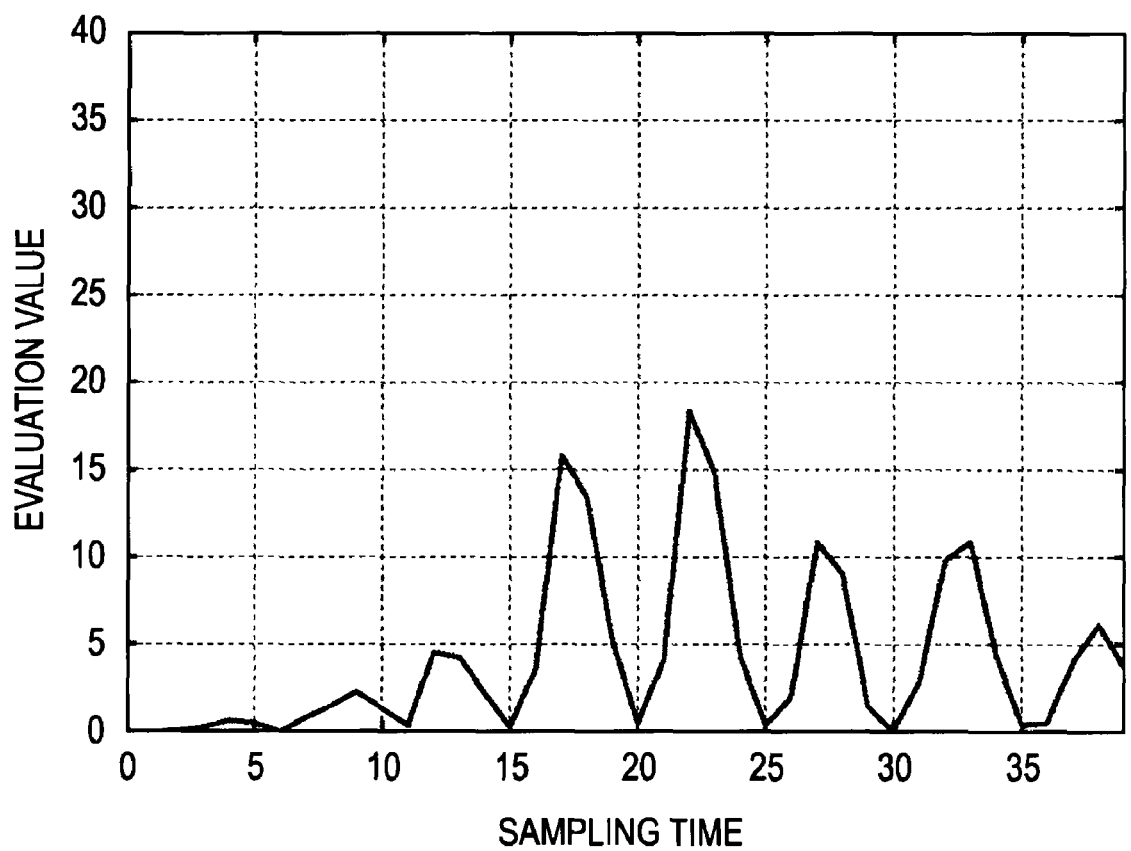
FIG. 30 is a graph showing an example of the intercede distance.

FIGS. 29 and 30 show examples of the evaluation value.

In FIGS. 29 and 30, the horizontal axis indicates a time axis and the time passes from the left-hand side in the figure to the right-hand side. The vertical axis indicates the evaluation value, i.e., a value obtained by summing the intercede distances for all baseband signal patterns, and the higher it goes in the figures, the greater the value is.

FIG. 29 shows an example of an evaluation value obtained by summing intercede distances resulting from applying (ptrn0, ptrn1)=(01010101, 10101010) to all symbol patterns. FIG. 30 shows an example of an evaluation value obtained by summing intercede distances resulting from applying (ptrn0, ptrn1)=(01010101, 10100101) to all symbol patterns.

Referring back to FIG. 24, the intercode-distance calculating section 74 input the computed evaluation values (e.g., the evaluation values shown in FIGS. 29 and 30) to the optimum-code-pattern selecting section 75.

With respect to the evaluation value input from the intercode-distance calculating section 74, the optimum-code-pattern selecting section 75 selects an optimum ptrn0-and-ptrn1 combination and outputs the selected combination on the basis of, for example, a value obtained by summing the distances between codes at all phases in a symbol or a maximum distance of the distances between codes in a symbol.

For example, in FIGS. 29 and 30, when the intercede distances at all phases in a symbol are to be summed, the optimum-code-pattern selecting section 75 may perform integration along the time direction. When a largest one of the intercede distances in a symbol is to be selected, for example, in FIG. 29, the evaluation value at the 38th sample of the 40 samples in one-symbol time becomes the largest, and in FIG. 30, the evaluation value at the 22nd sample of the 40 samples becomes the largest. In this case, since the evaluation value at the 38th sample in FIG. 29 is larger than the evaluation value at the 22nd sample in FIG. 30, the optimum-code-pattern selecting section 75 selects the combination shown in FIG. 29.

The optimum ptrn0-and-ptrn1 combination (e.g., (ptrn0, ptrn1)=(01010101, 10101010) shown n FIG. 29) selected by the optimum-code-pattern selecting section 75 is set in the transmitting-side transmitter 11 as a carrier-wave pattern.

On the other hand, the receiving-side receiver 12 performs bit determination at a spot at which the intercede distance in the symbol becomes maximum. As a result, without preparation of a synchronization circuit, a LPF, or the like, the receiver 12 can directly obtain a baseband signal from a radio frequency band. That is, an optimum sampling position (indicating a position at which the intercede distance is maximum), such as the 38th sampling position of the 40 samples in the example of FIG. 29, is set in the receiver 12.

For example, in FIG. 29, since the evaluation value at the 38th sample of the 40 samples denoted by 0 to 39 becomes maximum, the receiver 12 performs bit determination at the 38th sample, thus making it possible to reliably perform determination between code 1 and code 0.

In the case of the technique of the related art, the sampling position is the 20th sampling position, which is the center of the 40 samples. Thus, when sampling is performed at the position, it is difficult to expect that reliable bit determination is performed.

As described above, according to the present embodiment, since transmission-channel characteristics are learned for all bit patterns, it is possible to select the optimum carrier-wave pattern.

Selection of the optimum carrier-wave pattern makes it possible to reduce the amount of influence of frequency selective distortion and so on and also makes it possible to optimize timing at which a symbol is determined from an evaluation value used during the selection of the optimum carrier-wave pattern.

The learning for setting the optimum carrier-wave pattern at the transmitting side and setting the optimum sampling position at the receiving is performed, for example, when the transmitter 11 and the receiver 12 are powered on or are shipped from the factory. In addition, for example, in communication between substrates in a housing, the optimum carrier-wave pattern and the sampling position are determined for each substrate.

Next, a description is given of processing performed by the transmitter 11, the receiver 12, the learning apparatus 31, and the pattern selecting apparatus 61.

The transmission processing performed by the transmitter 11 shown in FIG. 11 will first be described with reference to a flowchart shown in FIG. 31.

Figure 31:
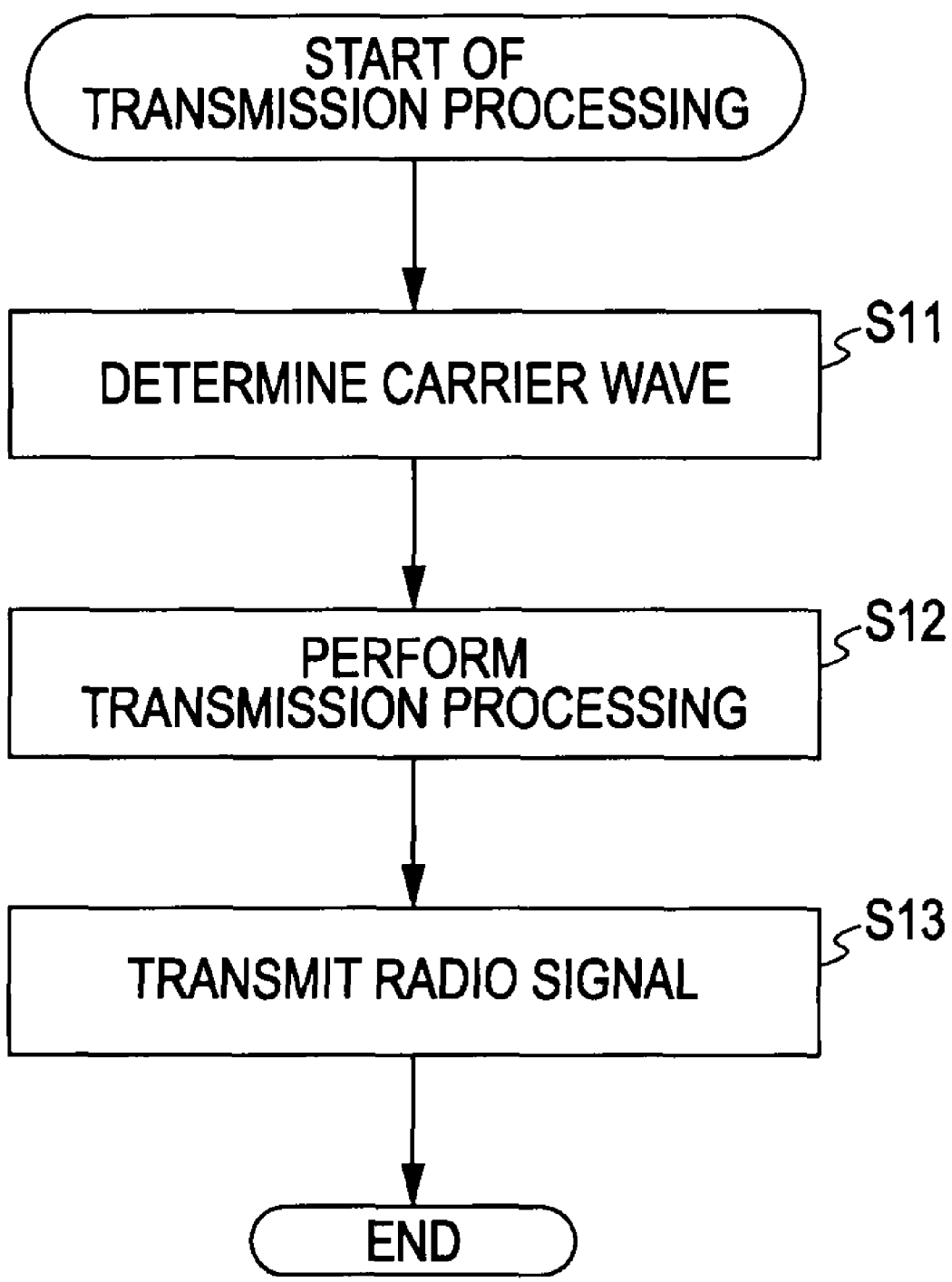
FIG. 31 is a flowchart illustrating transmission processing.

A description in FIG. 31 is given assuming that an optimum carrier-wave pattern is preset in the transmitter 11 by the pattern selecting apparatus 61 (the presetting corresponds to processing in step S43 described below and shown in FIG. 33).

In step S11, the carrier-wave determining section 22 determines an optimum carrier wave on the basis of the carrier-wave pattern set by the pattern selecting apparatus 61 and supplies the determined optimum carrier wave to the transmission processing section 21.

In step S12, as transmission processing, the transmission processing section 21 modulates an input baseband signal by multiplying it by the optimum carrier wave supplied from the carrier-wave determining section 22. The transmission processing section 21 supplies a radio signal, obtained from the modulation, to the antenna 23. In step S13, the antenna 23 transmits the radio signal, supplied from the transmission processing section 21, to the receiver 12.

As described above, the transmitter 11 performs transmission processing for transmitting the radio signal, modulated from the baseband signal, to the receiver 12.

Reception processing performed by the receiver 12 shown in FIG. 12 will now be described with reference to a flowchart shown in FIG. 32.

Figure 32:
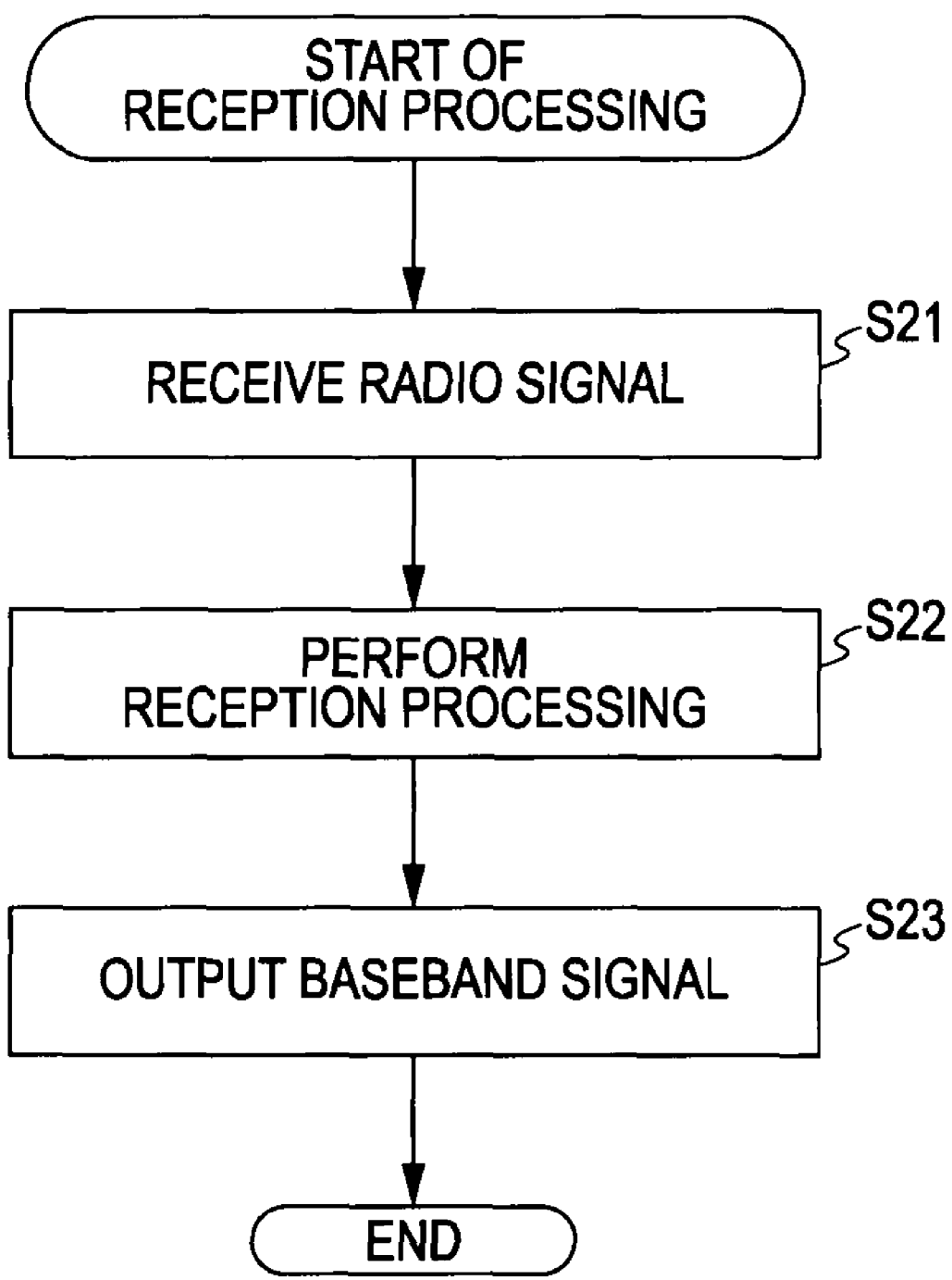
FIG. 32 is a flowchart illustrating reception processing.

A description in FIG. 32 is given assuming that an optimum sampling position is preset in the optimum-sampling-position holding section 25B in the receiver 12 by the pattern selecting apparatus 61 (the presetting corresponds to processing in step S44 described below and shown in FIG. 33).

In step S21, the antenna 24 receives a radio signal transmitted from the transmitter 11 and supplies the received radio signal to the reception processing section 25.

In step S22, as reception processing, the reception processing section 25 performs bit determination on the radio signal, supplied from the antenna 24, at a spot at which the intercede distance specified by the optimum sampling position is maximum, to thereby demodulate the radio signal into the baseband signal.

In step S23, the reception processing section 25 outputs the baseband signal, obtained from the demodulation, to a subsequent circuit (not shown).

As described above, the transmitter 12 performs reception processing for demodulating the radio signal, received from the transmitter 11, into the baseband signal.

Optimum-carrier-wave pattern determination processing performed by the learning apparatus 31 shown in FIG. 13 and the pattern selecting apparatus 61 shown in FIG. 24 will now be described with reference to a flowchart shown in FIG. 33.

In step S31, the transmission-channel learning section 44 in the learning apparatus 31 performs learning using a PRBS at a carrier-wave rate. In step S32, the transmission-channel learning section 44 generates a transmission-channel profile. The generated transmission-channel profile is held by the transmission-channel-profile holding section 53 and the transmission-channel-profile holding section 73.

In step S33, the number-of-influence-bits calculating section 54 checks the range of influence of reflection waves on the basis of transmission-channel characteristics indicated by the transmission-channel profile and determines the number $N_c$ of valid carrier-wave signals.

Figure 34:
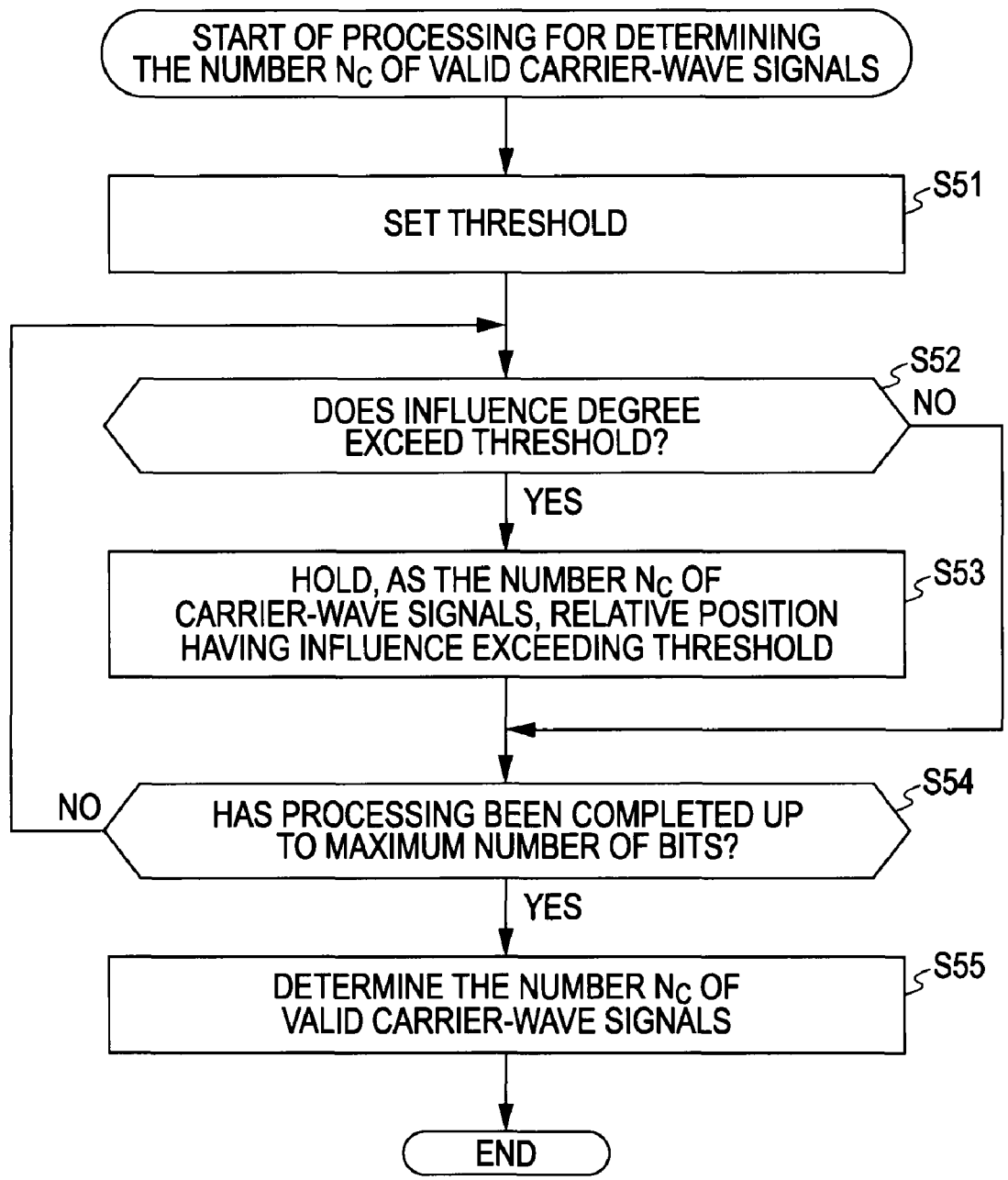
FIG. 34 is a flowchart illustrating processing for determining the number $N_c$ of valid carrier-wave signals.

Details of a method for determining the number $N_c$ of valid carrier-wave signals in step S33 will now be described with reference to a flowchart shown in FIG. 34.

In step S51, the number-of-influence-bits calculating section 54 sets a threshold for limiting the absolute value of the influence degree at the relative position bit shown in FIG. 20. In step S52, the number-of-influence-bits calculating section 54 compares the threshold with the absolute value of the influence degree of the first preceding bit to thereby determine whether or not the influence degree exceeds the threshold.

When it is determined in step S52 that the influence degree exceeds the threshold, the process proceeds to step S53. In step S53, the number-of-influence-bits calculating section 54 holds the relative position bit having an influence exceeding the threshold. For example, in this case, the number $N_c$ of carrier-wave signals is the first preceding bit.

In step S54, the number-of-influence-bits calculating section 54 determines whether or not the processing has been completed up to a maximum number of bits. For example, in FIG. 20, since the number of maximum bits is −90 (the 90th preceding bit), it is determined in step S54 that the processing has not be completed up to the number of maximum bits and the process returns to step S52. The processing in steps S52 to S54 is then repeated.

That is, the processing in steps S52 to S54 is repeated, so that whether or not the absolute value of the influence degree exceeds the threshold is determined for each of the bits from the first preceding bit to the 90th preceding bit and the relative position bit exceeding the threshold is held as the number $N_c$ of carrier-wave signals. When the processing for comparing the influence degrees up to the 90th preceding bit with the threshold is completed, the process proceeds to step S55.

In step S55, the number-of-influence-bits calculating section 54 determines, as the number $N_c$ of valid carrier-wave signals, the relative position of the bit (e.g., 80 bits) that is the most distant from the current bit from the held numbers $N_c$ of carrier-wave signals. Then, the processing for determining the number $N_c$ of valid carrier-wave signals ends.

Figure 35:
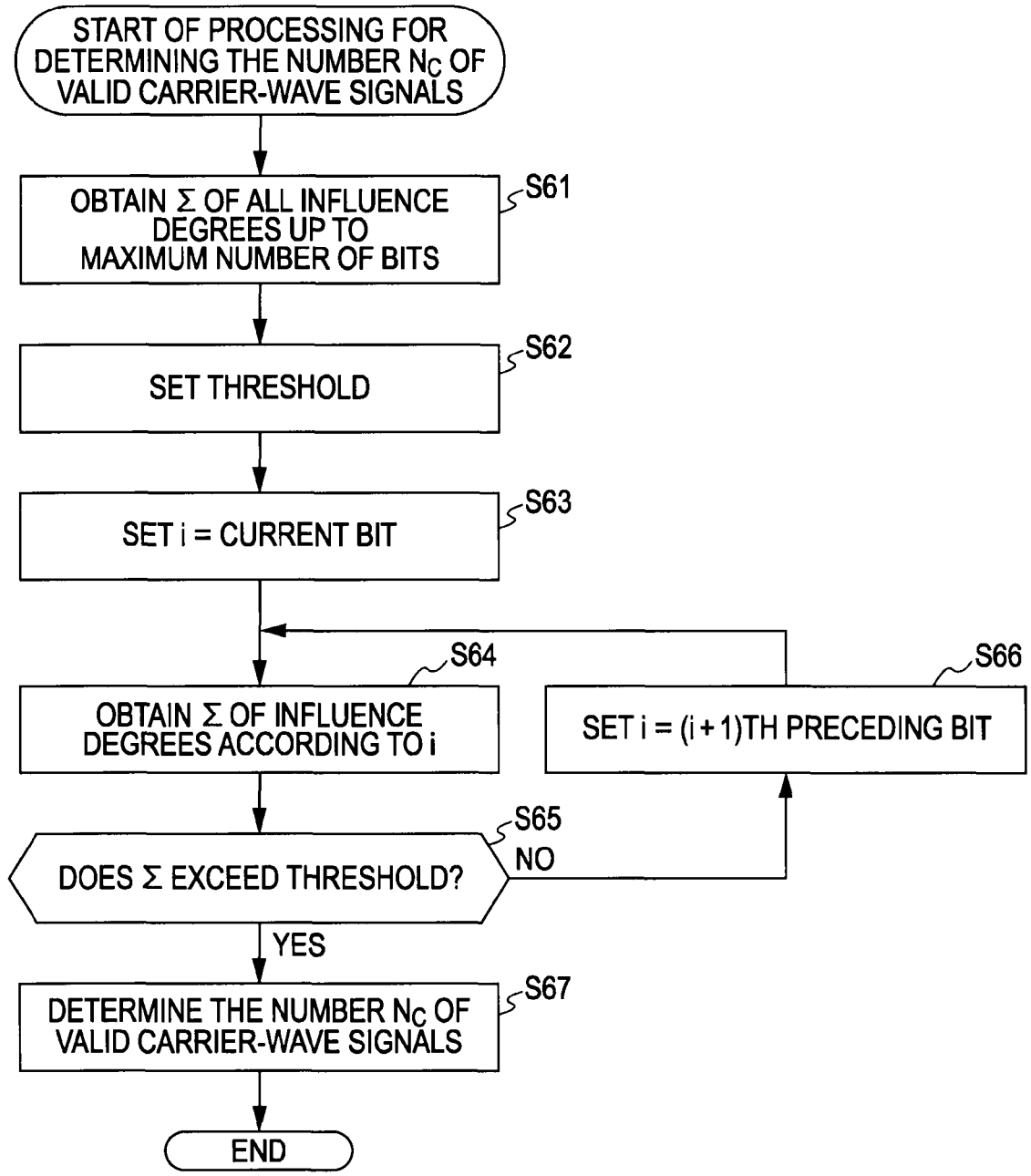
FIG. 35 is a flowchart illustrating the processing for determining the number $N_c$ of valid carrier-wave signals.

In this manner, in the method for determining the number $N_c$ of valid carrier-wave signals, the valid range may be set to a range in which the absolute value of influence degree exceeds a predetermined threshold, as described above, or may also be set to a range in which the cumulative sum of the influence degrees exceeds a predetermined threshold. Thus, a method for setting the valid range to a range in which the cumulative sum of the influence degrees exceeds a predetermined threshold will be described next with reference to a flowchart shown in FIG. 35.

In step S61, the number-of-influence-bits calculating section 54 obtains $\Sigma$ (the cumulative sum) of all influence degrees up to a maximum number of bits, such as the preceding 90 bits in FIG. 20. In step S62, the number-of-influence-bits calculating section 54 sets a threshold for limiting the cumulative sum of the absolute values of the influence degrees.

Subsequently, in step S63, the number-of-influence-bits calculating section 54 sets the current bit as an initial value for the cumulative sum i of the influence degrees. In step S64, the number-of-influence-bits calculating section 54 obtains the cumulative sum ($\Sigma$) of the influence degrees of the current bit. In step S65, the number-of-influence-bits calculating section 54 determines whether or not the cumulative sum of the influence degrees of the current bit exceeds the threshold.

When it is determined in step S65 that the cumulative sum of the influence degrees does not exceed the threshold, the process proceeds to step S66. In step S66, the number-of-influence-bits calculating section 54 increments the cumulative sum i of the influence degrees by 1 and, in step S64, the number-of-influence-bits calculating section 54 obtains the cumulative sum of the influence degrees of the first preceding bit. Thereafter, in step S65, the number-of-influence-bits calculating section 54 re-determines whether or not the cumulative sum of the influence degrees of the first preceding bit exceeds the threshold.

When it is determined in step S65 that the cumulative sum i of the influence degrees of the first preceding bit does not exceed the threshold, the processing in steps S64 to S66 is repeated until it is determined that the cumulative sum i of the influence degrees exceeds the threshold.

That is, as a result of the repeated processing in steps S64 to S66, the cumulative sum of the influence degrees of the second preceding bit, the third preceding bit, the fourth preceding bit, ..., and so on are sequentially compared with the threshold. For example, when it is determined that the cumulative sum of the influence degrees of the 80th preceding bit exceeds the threshold, the process proceeds to step S67. In step S67, the number-of-influence-bits calculating section 54 determines that 80 bits is the number $N_c$ of valid carrier-wave signals, thereby ending the processing for determining the number $N_c$ of valid carrier-wave signals.

The number $N_c$ of valid carrier-wave signals is determined as described above.

Figure 33:
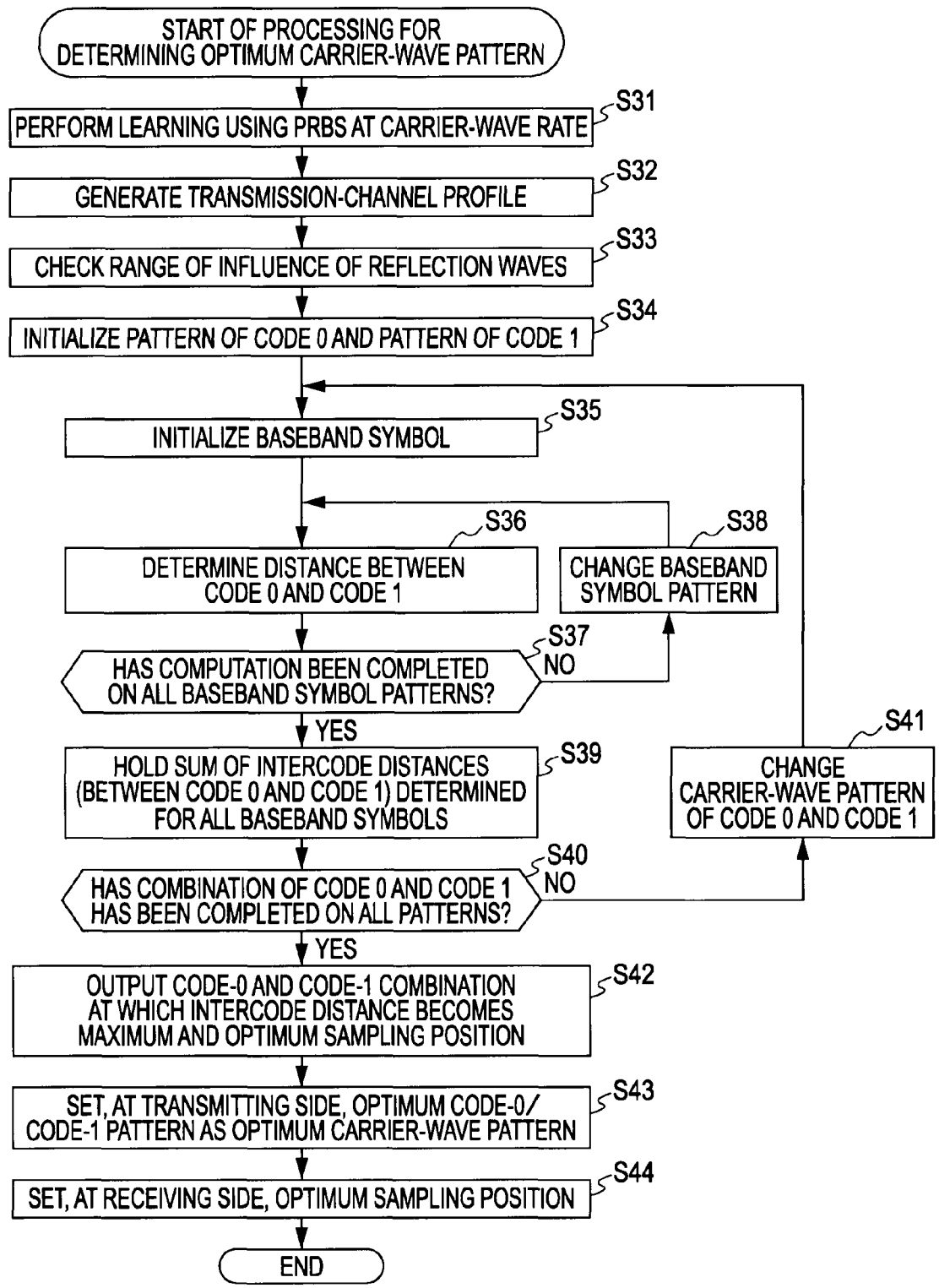
FIG. 33 is a flowchart illustrating processing for determining an optimum-carrier-wave pattern.

Referring back to the flowchart shown in FIG. 33, in step S34, the code-pattern replacing section 71 in the pattern selecting apparatus 61 initializes the pattern (ptrn0) of code 0 and the pattern (ptrn1) of code 1.

In step S35, the convolution computing section 72 initializes the baseband symbol. For example, the convolution computing section 72 determines the waveform of ptrn0 and ptrn1 in a specific symbol, as shown in FIG. 27 or 28, by computing equation (2), and supplies the determined waveform to the intercode-distance calculating section 74.

In step S36, the intercode-distance calculating section 74 computes, for example, equation (13) or (14) by using the reception signal determined from the convolution computing section 72, to thereby determine an intercede distance between code 0 (ptrn0) and code 1 (ptrn1), as shown in FIG. 27 or 28.

In step S37, the convolution computing section 72 determines whether or not the computation of the intercede distances has been completed on all baseband-symbol patterns.

When it is determined in step S37 that the computation has not been completed on all baseband-symbol patterns, the process proceeds to step S38. In step S38, the convolution computing section 72 changes the baseband-symbol pattern, and then the process returns to step S36. The processing in steps S36 to S38 is repeated until it is determined in step S37 that the computation has been completed on all baseband-symbol patterns. Consequently, the intercode-distance calculating section 74 determines the intercede distances for all baseband-symbol patterns.

In step S39, by computing, for example, equation (15) or (16), the intercode-distance calculating section 74 determines a value resulting from summing of the intercede distances. The intercode-distance calculating section 74 holds the distance sum obtained by summing the intercede distances (i.e., between code 0 and code 1) determined for all baseband symbols, for example, as shown in FIG. 29 or 30.

In step S40, the code-pattern replacing section 71 determines whether or not combination of code 0 (ptrn0) and code 1 (ptrn1) has been completed on all patterns.

When it is determined in step S40 that combination of code 0 and code 1 has not been completed on all patterns, the process proceeds to step S41 in which the code-pattern replacing section 71 changes the carrier-wave pattern (the carrier pattern) of code 0 and code 1.

Thereafter, the process returns to step S35 and the above-described processing in steps S35 to S41 is repeated. That is, as a result of the repeated processing in steps S35 to S41, the combination of ptrn0 and ptrn1 is sequentially changed, and the sum of the code-0 and code-1 distances determined from all baseband symbols with respect to all carrier-wave patterns is determined. The intercode-distance calculating section 74 then supplies the distance sum, determined by summing the intercode distances, to the optimum-code-pattern selecting section 75 as an evaluation value.

In step S42, using the evaluation value supplied from the intercode-distance calculating section 74, the optimum-code-pattern selecting section 75 selects, as an optimum code-0/code-1 pattern, the ptrn0-and-ptrn1 combination with which the intercede distance in a symbol becomes maximum, for example, as shown in FIG. 29 or 30, in accordance with a predetermined rule. Further, the optimum-code-pattern selecting section 75 selects, as an optimum sampling position, the position at which the evaluation value becomes maximum, and outputs the selected optimum sampling position.

In step S43, the optimum code-0/code-1 pattern output from the optimum-code-pattern selecting section 75 is set in the transmitting-side transmitter 11 as the optimum carrier-wave pattern. In step S44, the optimum sampling position output from the optimum-code-pattern selecting section 75 is set in the receiving-side receiver 12, thereby ending the processing for determining the optimum carrier-wave pattern.

As described above, the optimum carrier-wave pattern and the optimum sampling position determined by the learning apparatus 31 and the pattern selecting apparatus 61 are set in the transmitter 11 and the receiver 12, respectively.

As described above, according to the present invention, since transmission-channel characteristics are learned for all bit patterns, the transmitting-side can adaptively select the optimum carrier-wave pattern in accordance with deterioration of a transmission channel. As a result, even in an environment where the amount of transmission-channel distortion is large, it is possible to reduce the amount of influence due to frequency selective distortion and so on and it is possible to perform robust wireless communication.

In addition, according to the present invention, it is also possible to optimize timing at which a symbol is determined from the evaluation value used during selection of the optimum carrier-wave pattern. Additionally, since a circuit for converting a radio frequency band into a baseband can be eliminated, it is possible to simplify the receiving-side demodulation circuit.

Additionally, according to the present invention, it is possible to perform multiplexing using carrier-wave patterns.

The above-described series of processing can be executed by hardware or software. When the series of processing is executed by software, a program included in the software is installed from a program storage medium to, for example, a computer incorporated in dedicated hardware or to a general-purpose personal computer that is capable of executing various functions through installation of programs.

FIG. 36 is a block diagram showing an example of the configuration of a personal computer that executes the above-described series of processing trough the use of a program. A CPU (central processing unit) 111 executes various types of processing in accordance with a program stored in a ROM (read only memory) 112 or a storage section 118. The program, data, and so on executed by the CPU 111 are stored in a RAM (random access memory) 113, as appropriate. The CPU 111, the ROM 112, and the RAM 113 are interconnected through a bus 114.

An input/output interface 115 is connected to the CPU 111 through the bus 114. An input section 116 including a microphone and so on and an output section 117 including a display, a speaker, and so on are connected to the input/output interface 115. The CPU 111 executes various types of processing in accordance with instructions input from the input section 116. The CPU 111 then outputs a result of the processing to the output section 117.

The storage section 118 is connected to the input/output interface 115 and is implemented by, for example, a hard disk to store the program and various data executed by the CPU 111. A communication section 119 serves as an interface including a router, a modem, or the like, and communicates with an external apparatus through a network, such as the Internet and/or a local area network.

A program may be obtained via the communication section 119 and be stored on the storage section 118.

A drive 120 is connected to the input/output interface 115. Upon insertion of a removable medium 121, such as a magnetic disk, an optical disk, a magneto optical disk, or a semiconductor memory, the drive 120 drives the removable medium 121 to obtain a program, data, and so on stored thereon. The obtained program and data are transferred to the storage section 118 and recorded thereon, as appropriate.

Examples of the program storage medium that stores a program that becomes executable by a computer through installation thereto include, as shown in FIG. 36, the removable medium 121, the ROM 112 that temporarily or permanently stores the program, and a hard disk included in the storage unit 118. Examples of the removable medium 121 include a magnetic disk (including a flexible disk), an optical disk (including a CD-ROM [compact disk–read only memory] and a DVD [digital versatile disc]), a magneto optical disk, and a package medium including a semiconductor memory or the like. The program is stored on the storage medium through wired or wireless communication media, such as a local network, the Internet, and digital satellite broadcast, via the communication section 119, as appropriate.

Herein, the steps for describing the program stored on the storage medium not only include processing that is time-sequentially performed according to the described sequence, but also include processing that is concurrently or individually executed without being necessarily time-sequentially processed.

The term "system" herein refers to entire equipment including multiple apparatuses.

The present invention is not limited to the above-described embodiments, and various changes can be made thereto without departing from the spirit and scope of the present invention.

The present application contains subject matter related to that disclosed in Japanese Priority Patent Application JP filed in the Japan Patent Office on May 12, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission apparatus comprising:
   modulating means for modulating a baseband signal by using a carrier wave;
   determining means for determining a pattern of the carrier wave, in accordance with a characteristic of a transmission channel on which a waveform represented by a signal value of a specific symbol is stationarily distorted according to a value of a symbol transmitted before or after the specific symbol; and
   transmitting means for transmitting a modulation signal through the transmission channel, the modulation signal being obtained by modulation using the determined carrier-wave pattern, wherein
   the transmission-channel characteristic is determined through learning using a least-squares method, wherein a known signal is used as student data that serves as a student for learning a characteristic of the distortion and the known signal deteriorated through the transmission channel is used as teacher data that serves as a teacher for learning the distortion.

2. The transmission apparatus according to claim 1, wherein the carrier-wave pattern is a code-0 and code-1 combination with which an intercode distance is maximum when the transmission-channel characteristic obtained through the learning is used to estimate a reception waveform on a basis of all symbols patterns and carrier-wave patterns is maximum.

3. The transmission apparatus according to claim 2, wherein the carrier-wave pattern is determined in a range of the number of carrier-wave signals, the number being determined in accordance with a size of influence of a symbol transmitted before the specific symbol, the influence being exerted on a specific symbol.

4. A transmission method comprising the steps of:
   modulating a baseband signal by using a carrier wave;
   determining a pattern of the carrier wave, in accordance with a characteristic of a transmission channel on which a waveform represented by a signal value of a specific symbol is stationarily distorted according to a value of a symbol transmitted before or after the specific symbol; and
   controlling transmission of a modulation signal through the transmission channel, the modulation signal being obtained by modulation using the determined carrier-wave pattern wherein
   the transmission-channel characteristic is determined through learning using a least-squares method, wherein a known signal is used as student data that serves as a student for learning a characteristic of the distortion and the known signal deteriorated through the transmission channel is used as teacher data that serves as a teacher for learning the distortion.

5. A non-transitory computer-readable medium including a program causing a computer to execute the steps of:
   modulating a baseband signal by using a carrier wave;
   determining a pattern of the carrier wave, in accordance with a characteristic of a transmission channel on which a waveform represented by a signal value of a specific symbol is stationarily distorted according to a value of a symbol transmitted before or after the specific symbol; and
   controlling transmission of a modulation signal through the transmission channel, the modulation signal being obtained by modulation using the determined carrier-wave pattern, wherein
   the transmission-channel characteristic is determined through learning using a least-squares method, wherein a known signal is used as student data that serves as a student for learning a characteristic of the distortion and the known signal deteriorated through the transmission channel is used as teacher data that serves as a teacher for learning the distortion.

6. A reception apparatus comprising:
   receiving means for receiving a modulation signal transmitted through a transmission channel on which a waveform represented by a signal value of a specific symbol is stationarily distorted according to a value of a symbol transmitted before or after the specific symbol; and
   demodulating means for demodulating the received modulation signal into a baseband signal by performing bit determination at a sampling position corresponding to a characteristic of the transmission channel, wherein
   the characteristic of the transmission channel is determined through learning using a least-squares method, wherein a known signal is used as student data that serves as a student for learning a characteristic of the distortion and the known signal deteriorated through the transmission channel is used as teacher data that serves as a teacher for learning the distortion.

7. The reception apparatus according to claim 6, wherein the sampling position is a position at which an intercode distance between code 0 and code 1 is maximum when the transmission-channel characteristic obtained through the learning is used to estimate a reception waveform on a basis of all symbols patterns and carrier-wave patterns.

8. A reception method comprising the steps of:
   controlling reception of a modulation signal transmitted through a transmission channel on which a waveform represented by a signal value of a specific symbol is stationarily distorted according to a value of a symbol transmitted before or after the specific symbol; and
   demodulating the received modulation signal into a baseband signal by performing bit determination at a sampling position corresponding to a characteristic of the transmission channel, wherein
   the characteristic of the transmission channel is determined through learning using a least-squares method, wherein a known signal is used as student data that serves as a student for learning a characteristic of the distortion and the known signal deteriorated through the transmission channel is used as teacher data that serves as a teacher for learning the distortion.

9. A non-transitory computer-readable medium including a program causing a computer to execute the steps of:
- controlling reception of a modulation signal transmitted through a transmission channel on which a waveform represented by a signal value of a specific symbol is stationarily distorted according to a value of a symbol transmitted before or after the specific symbol; and
- demodulating the received modulation signal into a baseband signal by performing bit determination at a sampling position corresponding to a characteristic of the transmission channel, wherein
- the characteristic of the transmission channel is determined through learning using a least-squares method, wherein a known signal is used as student data that serves as a student for learning a characteristic of the distortion and the known signal deteriorated through the transmission channel is used as teacher data that serves as a teacher for learning the distortion.

10. A transmission apparatus comprising:
- a modulating section configured to modulate a baseband signal by using a carrier wave;
- a determining section configured to determine a pattern of the carrier wave, in accordance with a characteristic of a transmission channel on which a waveform represented by a signal value of a specific symbol is stationarily distorted according to a value of a symbol transmitted before or after the specific symbol; and
- a transmitting section configured to transmit a modulation signal through the transmission channel, the modulation signal being obtained by modulation using the determined carrier-wave pattern, wherein
- the transmission-channel characteristic is determined through learning using a least-squares method, wherein a known signal is used as student data that serves as a student for learning a characteristic of the distortion and the known signal deteriorated through the transmission channel is used as teacher data that serves as a teacher for learning the distortion.

11. The transmission apparatus according to claim 10, wherein the carrier-wave pattern is a code-0 and code-1 combination with which an intercode distance is maximum when the transmission-channel characteristic obtained through the learning is used to estimate a reception waveform on a basis of all symbols patterns and carrier-wave patterns is maximum.

12. The transmission apparatus according to claim 11, wherein the carrier-wave pattern is determined in a range of the number of carrier-wave signals, the number being determined in accordance with a size of influence of a symbol transmitted before the specific symbol, the influence being exerted on a specific symbol.

13. A reception apparatus comprising:
- a receiving section configured to receive a modulation signal transmitted through a transmission channel on which a waveform represented by a signal value of a specific symbol is stationarily distorted according to a value of a symbol transmitted before or after the specific symbol; and
- a demodulating section configured to demodulate the received modulation signal into a baseband signal by performing bit determination at a sampling position corresponding to a characteristic of the transmission channel, wherein
- the characteristic of the transmission channel is determined through learning using a least-squares method, wherein a known signal is used as student data that serves as a student for learning a characteristic of the distortion and the known signal deteriorated through the transmission channel is used as teacher data that serves as a teacher for learning the distortion, wherein
- the transmission-channel characteristic is determined through learning using a least-squares method, wherein a known signal is used as student data that serves as a student for learning a characteristic of the distortion and the known signal deteriorated through the transmission channel is used as teacher data that serves as a teacher for learning the distortion.

14. The reception apparatus according to claim 13, wherein the sampling position is a position at which an intercode distance between code 0 and code 1 is maximum when the transmission-channel characteristic obtained through the learning is used to estimate a reception waveform on a basis of all symbols patterns and carrier-wave patterns.

* * * * *